US012792546B2

(12) United States Patent
Vu et al.

(10) Patent No.: US 12,792,546 B2
(45) Date of Patent: Nov. 10, 2026

(54) SYSTEMS AND METHODS FOR USB SWITCHING IN A COLLABORATION SYSTEM

(71) Applicant: ScreenBeam Inc., San Jose, CA (US)

(72) Inventors: Chuong Vu, Cupertino, CA (US); Dean Chang, San Jose, CA (US); Chuang Li, Saratoga, CA (US)

(73) Assignee: ScreenBeam Inc., San Jose, CA (US)

(*) Notice: Subject to any disclaimer, the term of this patent is extended or adjusted under 35 U.S.C. 154(b) by 73 days.

(21) Appl. No.: 18/480,382

(22) Filed: Oct. 3, 2023

(65) Prior Publication Data

US 2024/0111699 A1 Apr. 4, 2024

Related U.S. Application Data

(60) Provisional application No. 63/413,200, filed on Oct. 4, 2022.

(51) Int. Cl.
*G06F 13/40* (2006.01)
*G06F 13/42* (2006.01)

(52) U.S. Cl.
CPC ...... *G06F 13/4022* (2013.01); *G06F 13/4282* (2013.01); *G06F 2213/0042* (2013.01)

(58) Field of Classification Search
CPC ............. G06F 13/4022; G06F 13/4282; G06F 2213/0042
(Continued)

(56) References Cited

U.S. PATENT DOCUMENTS

| | | | |
|---|---|---|---|
| 6,343,313 | B1 | 1/2002 | Salesky et al. |
| 10,560,499 | B2 | 2/2020 | Vu et al. |

(Continued)

FOREIGN PATENT DOCUMENTS

| | | | |
|---|---|---|---|
| CN | 118972083 | A | 11/2024 |
| EP | 1526445 | A2 | 4/2005 |

(Continued)

OTHER PUBLICATIONS

Barkay, et al., Evaluating Intel.RTM. Pro Wireless Display for Enterprise Use, Sep. 2013 (pp. 1-7).

(Continued)

*Primary Examiner* — Idriss N Alrobaye
*Assistant Examiner* — Henry W Yu
(74) *Attorney, Agent, or Firm* — Greenberg Traurig, LLP; Robert D. Ward

(57) ABSTRACT

Systems and methods for sharing USB room peripheral devices between a Unified Communication & Collaboration (UC&C) platform room device and a collaboration device, e.g., a wireless or non-wireless display receiver, for conducting Bring Your Own Meeting (BYOM) sessions are provided. The system may include a USB peripheral switching device operatively coupled to the room peripheral devices and the UC&C platform room device, and a collaboration device operatively coupled to the USB peripheral switching device, a plurality of user devices, and the UC&C platform room device. The USB peripheral switching device automatically switches from transferring data between the room peripheral devices and the UC&C platform room device when the collaboration device is in an idle state, to transferring data between the room peripheral devices and the collaboration device when the collaboration device is in an active state to conduct the BYOM conference.

20 Claims, 12 Drawing Sheets

(58) Field of Classification Search
USPC .............................. 710/2, 6, 18, 31, 33, 316
See application file for complete search history.

(56) References Cited

U.S. PATENT DOCUMENTS

| | | | | |
|---|---|---|---|---|
| 10,616,278 | B1 | 4/2020 | Johansson et al. | |
| 11,336,705 | B2 | 5/2022 | Vu et al. | |
| 11,483,367 | B2 | 10/2022 | Vu et al. | |
| 12,177,275 | B2 | 12/2024 | Vu et al. | |
| 2004/0019732 | A1* | 1/2004 | Overtoom | G06F 13/4022 710/313 |
| 2004/0221323 | A1 | 11/2004 | Watt | |
| 2005/0036509 | A1 | 2/2005 | Acharya et al. | |
| 2005/0273510 | A1 | 12/2005 | Schuh | |
| 2006/0031779 | A1 | 2/2006 | Theurer et al. | |
| 2007/0261102 | A1 | 11/2007 | Spataro et al. | |
| 2010/0333127 | A1 | 12/2010 | Scott et al. | |
| 2011/0246552 | A1 | 10/2011 | Nicholson et al. | |
| 2011/0271129 | A1 | 11/2011 | Flannagan et al. | |
| 2014/0103104 | A1 | 4/2014 | Jover | |
| 2014/0108506 | A1 | 4/2014 | Borzycki et al. | |
| 2014/0141725 | A1 | 5/2014 | Jesme et al. | |
| 2014/0330732 | A1 | 11/2014 | Grignon | |
| 2014/0337769 | A1 | 11/2014 | Kim et al. | |
| 2014/0362161 | A1* | 12/2014 | Leete, III | H04W 4/00 348/14.02 |
| 2015/0009279 | A1* | 1/2015 | Vijayakumar | H04N 7/152 348/14.09 |
| 2015/0089452 | A1 | 3/2015 | Dorninger | |
| 2015/0188838 | A1 | 7/2015 | Bhattacharya et al. | |
| 2015/0326654 | A1 | 11/2015 | Lee et al. | |
| 2016/0295167 | A1 | 10/2016 | Sakurai | |
| 2017/0195374 | A1 | 7/2017 | Vu et al. | |
| 2017/0351757 | A1 | 12/2017 | Strober | |
| 2018/0131148 | A1* | 5/2018 | Liu | G05B 15/02 |
| 2018/0247550 | A1 | 8/2018 | Lu et al. | |
| 2018/0375907 | A1 | 12/2018 | Ivov et al. | |
| 2020/0090536 | A1 | 3/2020 | Xiong et al. | |
| 2020/0177650 | A1 | 6/2020 | Vu et al. | |
| 2020/0236326 | A1* | 7/2020 | Heatley | H04N 7/147 |
| 2021/0058584 | A1* | 2/2021 | Decamp | G06F 3/1423 |

FOREIGN PATENT DOCUMENTS

| | | | |
|---|---|---|---|
| WO | WO-2012088419 | A1 | 6/2012 |
| WO | WO-2014185690 | A1 | 11/2014 |

OTHER PUBLICATIONS

Intel® Pro Wireless Display—White Paper, 12 pages (2015).
Intel.RTM. Pro WiDi Quick Start Guide, 1 page (2015).
Intel.RTM. Pro Wireless Display Implementation Guide, Version 2.4, 52 pages (Nov. 2015).
Intel.RTM. Pro Wireless Display Users Guide, Version 2.0, 28 pages (2015).
International Search Report & Written Opinion dated Apr. 5, 2017 in Int'l PCT Patent Appl. Serial No. PCT/US2016/068989 (2410), 9 pages.
International Search Report & Written Opinion dated Feb. 26, 2021 in Int'l PCT Patent Appl. Serial No. PCT/US2020/062427 (3110).
NetSupport School, Product Manual—Version 12.00, 2015, (382 pages).
NetSupport School, Tutor for Android Manual, 2015 (63 pages).
Samsung AllShare Cast Dongle User Guide, 2013, (82 pages).

* cited by examiner

PRIOR ART

SYSTEMS AND METHODS FOR USB SWITCHING IN A COLLABORATION SYSTEM

CROSS-REFERENCE TO RELATED APPLICATIONS

This application claims priority to U.S. Provisional Patent Appl. No. 63/413,200, filed Oct. 4, 2022, the entire contents of which are incorporated herein by reference.

FIELD OF USE

The present disclosure is directed to systems and methods for sharing USB room peripheral devices between a Unified Communication & Collaboration (UC&C) platform room device and a collaboration device for conducting Bring Your Own Meeting (BYOM) meetings.

BACKGROUND

Unified Communications and Collaboration (UC&C) is not a single tool or product, but a collection of solutions, which organizations implement to ensure that nearly all their technology works together, smoothly and securely, for near real-time collaboration. UC&C integrates diverse communication tools, such as Voice, IP Telephony Calling, Instant Messaging, Desktop Sharing, Presence, and Web Conferencing, Audio Conferencing, and Video Conferencing, to interact together in a virtually seamless way. A UC&C platform room device is a combination of enterprise communication tools assembled into a single interface and integrated into a single management system.

Current systems using dedicated UC&C platform room devices are limited to specific platforms supported by the dedicated UC&C platform room device. For example, a UC&C platform room device such as Zoom Rooms, which is dedicated to Zoom Meetings, cannot operate another platform, e.g., Microsoft Teams Meetings. Moreover, a user could not initiate a Bring Your Own Meeting (BYOM) conference using a laptop which supports the alternative platform because the laptop cannot access the room peripherals devices operatively coupled to the UC&C platform room device.

In view of the foregoing drawbacks of previously known systems and methods, there exists a need for a systems and methods that permit sharing room peripheral devices between a UC&C platform room device and a collaboration device, e.g., a wireless or non-wireless display receiver, for conducting BYOM meetings.

SUMMARY

The present disclosure overcomes the drawbacks of previously-known systems and methods by providing a system for sharing one or more room peripheral devices, e.g., camera(s), microphone(s), speaker(s), etc., between a UC&C platform room device and a collaboration device, e.g., a wireless display receiver, for conducting a BYOM conference. In some embodiments, the collaboration device may be a non-wireless display receiver. Accordingly, the one or more room peripheral devices may be shared with one or more users, e.g., one or multiple presenters, operatively coupled to the wireless display receiver. The systems described herein may automatically share control between the UC&C platform room device and the wireless display receiver, e.g., if the UC&C platform room device is not running the same application as a remote user device, whether the UC&C platform room device includes an HDMI input port or not. The UC&C platform room device may be a dedicated platform room device or may be, e.g., a desktop PC that may download and run various conferencing applications.

In accordance with one aspect of the present disclosure, a system for sharing control of one or more room peripheral devices between a UC&C platform room device operatively coupled to a room display and a BYOM host user device for conducting a BYOM conference, the BYOM host user device operatively coupled to a remote user device, is provided. The system may comprising a collaboration device, e.g., a wireless display receiver, configured to be operatively coupled to a plurality of user devices and to the UC&C platform room device, and a USB peripheral switching device configured to be operatively coupled to the collaboration device, the one or more room peripheral devices, and to the UC&C platform room device. The collaboration device may be configured to selectively transmit video data from the plurality of user devices and the remote user device to the UC&C platform room device, and to automatically switch from an idle state to an active state upon initiation of the BYOM conference by the BYOM host user device. The USB peripheral switching device may be configured to automatically switch control of the one or more room peripheral devices between the UC&C platform room device when the collaboration device is in the idle state and the collaboration device when the collaboration device is in the active state. The one or more room peripheral devices may comprise at least one of a USB camera, USB microphone, or USB speaker.

When the collaboration device is in the idle state, video data may be transmissible from a UC&C host user device to a remote user device operatively coupled to the UC&C platform room device and to the room display via the UC&C platform room device, from at least one of the one or more room peripheral devices to the remote user device operatively coupled to the UC&C platform room device and to the room display via the UC&C platform room device, and between the UC&C platform room device and the remote user device operatively coupled to the UC&C platform room device, and video data may be selectively transmissible from the plurality of user devices and the remote user device operatively coupled to the UC&C platform room device to the room display via the UC&C platform room device, and from the plurality of user devices to the remote user device operatively coupled to the UC&C platform room device via the UC&C platform room device, responsive to user input received by the UC&C host user device. In addition, when the collaboration device is in the active state, video data may be transmissible from the BYOM host user device to the room display via the UC&C platform room device, from at least one of the one or more room peripheral devices to the remote user device via the BYOM host user device and to the room display via the UC&C platform room device, and between the BYOM host user device and the remote user device operatively coupled to the BYOM host user device, and video data may be selectively transmissible from the plurality of user devices and the remote user device to the room display via the UC&C platform room device, and from the plurality of user devices to the remote user device via the BYOM host user device, responsive to user input received by the BYOM host user device.

The USB peripheral switching device may be operatively coupled to the collaboration device via an in-band USB switch control configured to sense voltage associated with a USB host port of the collaboration device. Accordingly, the USB peripheral switching device may be configured to automatically switch control of the one or more room peripheral devices to the collaboration device based on the sensed voltage of the USB host port of the collaboration device. The BYOM host user device may comprise a conferencing software application programmed to cause the collaboration device to transition to the active state when the BYOM host user device initiates the BYOM conference and to transition to the idle state when the BYOM host user device stops the BYOM conference. Moreover, the USB peripheral switching device may comprise a first host port configured to be operatively coupled to the UC&C platform room device via a first USB connection, a second host port configured to be operatively coupled to the collaboration device via a second USB connection, and one or more device ports configured to be operatively coupled to the one or more room peripheral devices via one or more USB connections. Accordingly, the USB peripheral switching device may be configured to direct data between the one or more device ports and the first host port when the collaboration device is in the idle state, and between the one or more device ports and the second host port when the collaboration device is in the active state.

When the collaboration device is in the active state, a USB switch control module of the collaboration device may cause a power of the second USB connection to reach a threshold power level, such that the second host port of the USB peripheral switching device transitions to an activated state when the power of the second USB connection is at the threshold power level. For example, the threshold power level may be 5 volts. The USB peripheral switching device may be configured to direct data between the one or more device ports and the second host port when the second host port transitions to the activated state. Moreover, when the collaboration device is in the idle state, the USB switch control module may cause the power of the second USB connection to be zero volts, such that the second host port transitions to an inactivated state when the power of the second USB connection is zero volts.

In some embodiments, the USB peripheral switching device and the collaboration device may be integrated within a single All-in-One (AIO) receiver device. The AIO receiver device may comprise a USB peripheral port configured to be operatively coupled to the UC&C platform room device via a first USB connection, and one or more device ports configured to be operatively coupled to the one or more room peripheral devices via one or more USB connections. In addition, the AIO receiver device further may comprise an HDMI output port configured to be operatively coupled to an HDMI input port of the UC&C platform room device via a first HDMI connection, such that the UC&C platform room device may be operatively coupled to the room display via a second HDMI connection. Alternatively, the AIO receiver device further may comprise a USB audio and video output port configured to be operatively coupled to a USB port of the UC&C platform room device via a second USB connection, such that the UC&C platform room device may be operatively coupled to the room display via an HDMI connection.

In accordance with one aspect of the present disclosure, a method for sharing control of one or more room peripheral devices between a UC&C platform room device operatively coupled to a room display and a BYOM host user device for conducting a BYOM conference, the BYOM host user device operatively coupled to a remote user device, is provided. The method may comprise: operatively coupling a collaboration device to a plurality of user devices and the UC&C platform room device; operatively coupling a USB peripheral switching device to the collaboration device, one or more room peripheral devices, and the UC&C platform room device; automatically switching, upon initiation of the BYOM conference by the BYOM host user device, the collaboration device from an idle state where the USB peripheral switching device automatically switches control of the one or more room peripheral devices to the UC&C platform room device to an active state where the USB peripheral switching device automatically switches control of the one or more room peripheral devices to the collaboration device; conducting the BYOM conference when the collaboration device is in the active state; and selectively transmitting, via the collaboration device, video data from the plurality of user devices and the remote user device to the UC&C platform room device.

Conducting the BYOM conference when the collaboration device is in the active state may comprise: transmitting video data from the BYOM host user device to the room display via the UC&C platform room device, from at least one of the one or more room peripheral devices to the remote user device via the BYOM host user device and to the room display via the UC&C platform room device, and between the BYOM host user device and the remote user device operatively coupled to the BYOM host user device; and selectively transmitting video data from the plurality of user devices and the remote user device to the room display via the UC&C platform room device, and from the plurality of user devices to the remote user device via the BYOM host user device, responsive to user input received by the BYOM host user device.

When the collaboration device is in the active state, a USB switch control module of the collaboration device may set a power level of a USB host port of the collaboration device to a threshold power level, e.g., 5 volts, which causes the USB peripheral switching device to sense, via an in-band USB switch control, voltage associated with the USB host port of the collaboration device, such that the USB peripheral switching device automatically switches control of the one or more room peripheral devices to the collaboration device based on the sensed voltage. When the collaboration device is in the active state, the USB switch control module of the collaboration device may set the power level of the USB host port of the collaboration device to zero volts, which causes the USB peripheral switching device to automatically switch control of the one or more room peripheral devices to the UC&C platform room device.

In some embodiments, the USB peripheral switching device and the collaboration device may be integrated within a single All-in-One (AIO) receiver device, such that conducting the BYOM conference when the collaboration device is in the active state may comprise transmitting video data between an HDMI output port of the AIO receiver device and an HDMI input port of the UC&C platform room device via a first HDMI connection, and between the UC&C platform room device and the room display via a second HDMI connection. Alternatively, conducting the BYOM conference when the collaboration device is in the active state may comprise transmitting video data between a USB audio and video output port of the AIO receiver device and a USB port of the UC&C platform room device via a USB connection, and between the UC&C platform room device and the room display via an HDMI connection. The method further may comprise automatically switching the collaboration device to the idle state when the BYOM host user device stops the BYOM conference.

DETAILED DESCRIPTION

Figure 1:
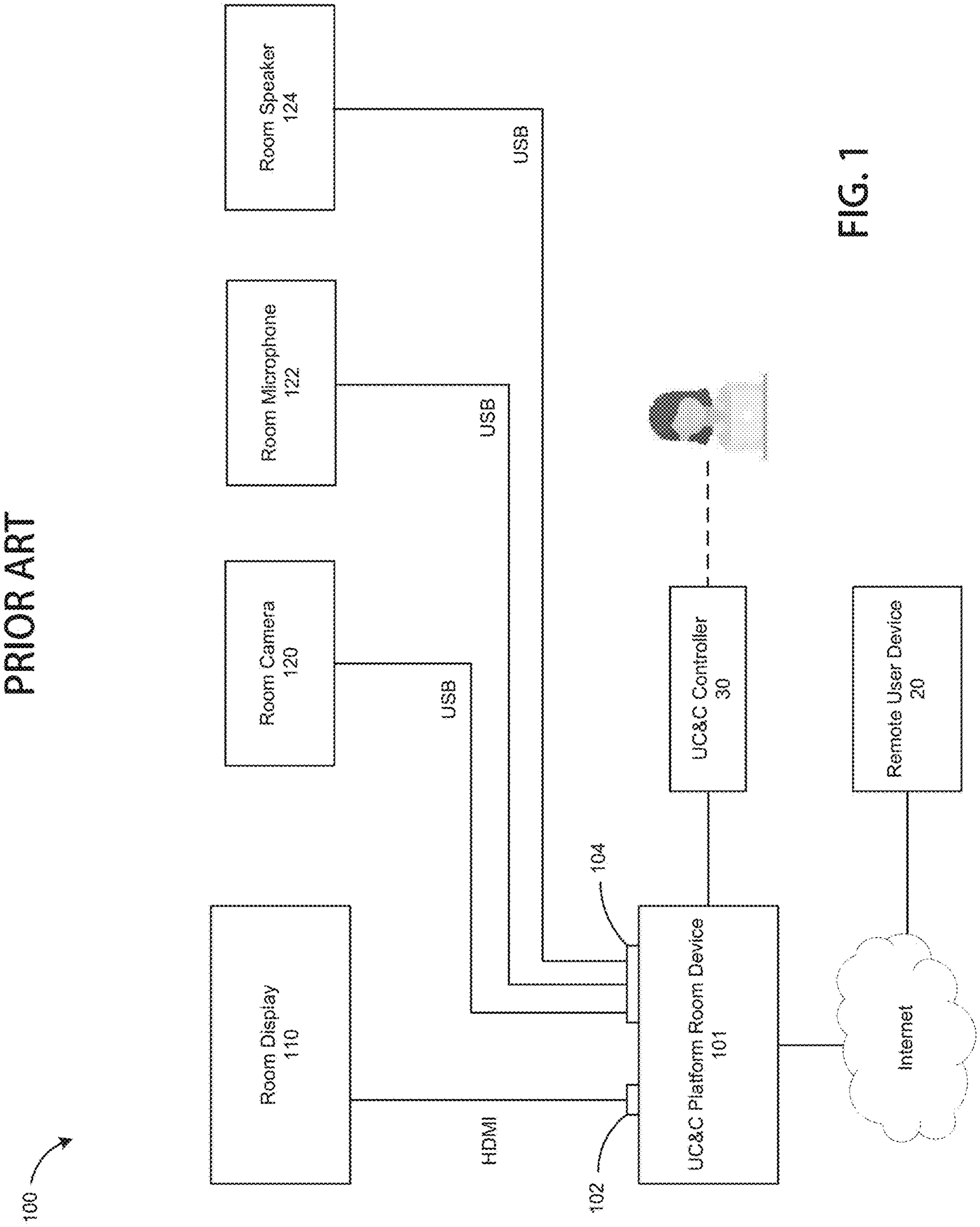
FIG. 1 illustrates a system for using a Unified Communication & Collaboration (UC&C) platform room device.

Current systems using dedicated UC&C platform room devices are limited to specific platforms supported by the dedicated UC&C platform room device. For example, FIG. 1 illustrates a system for using a UC&C platform room device. As shown in FIG. 1, system 100 may include UC&C platform room device 101, which may be operated by a conference host user through UC&C controller 30, e.g., an integral part of UC&C platform room device 101, and may be operatively coupled to room display 110 via HDMI output port 102, and to one or more room peripheral devices, e.g., USB room camera 120, USB room microphone 122, and USB room speaker 124, via one or more USB ports 104. Accordingly, data may be transmitted between the one or more room peripheral devices and UC&C platform room device 101 via one or more USB connections, e.g., USB cables, and video data, e.g., image and audio data, may be transmitted from UC&C platform room device 101 to room display 110 via an HDMI connection, e.g., an HDMI cable, and between UC&C platform room device 101 and remote user device 20 through Internet. However, system 100 is limited in that it does not support Bring Your Own Meeting (BYOM) capabilities as a user cannot access the one or more room peripherals via a user device, e.g., a laptop, if the user device is running a conferencing application that is not supported by UC&C platform room device 101. System 100 also does not provide convenient solution to share other user device screens for conference discussion.

Systems and methods for sharing USB room peripheral devices between a Unified Communication & Collaboration (UC&C) platform room device and a display receiver, e.g., a wireless or non-wireless display receiver, for conducting video conferencing including Bring Your Own Meeting (BYOM) meetings are provided. Specifically, the systems described herein permit a user device to control room peripheral devices, e.g., camera(s), microphone(s), and speaker(s) via the wireless display receiver, and share content with a remote conferencing site. The UC&C platform room device may be a generic PC that may be configured to download and run a variety of conferencing applications, or alternatively, may be a dedicated UC&C platform room device, e.g., a custom compute device designed to run a select type of conferencing application. Dedicated UC&C platform room devices such as Microsoft Teams Room (made available by Microsoft, Redmond, Washington) and Zoom Rooms (made available by Zoom video Communications, San Jose, California) connect to room peripheral devices, e.g., camera(s), microphone(s), and speaker(s), and permit a user video conference with remote user devices having corresponding video conference software. However, dedicated UC&C platform room devices are pre-configured and have pre-installed conferencing applications, and thus does not allow third party software installation.

Accordingly, when conducting a UC&C conference with a remote user device running the same conferencing application as the UC&C platform room device, content from a plurality of users operatively coupled to the wireless display receiver may be selectively shared with UC&C platform room device, and accordingly with the remote user device via the conferencing application, while the UC&C platform room device maintains control of the room peripheral devices. Alternatively, if the UC&C platform room device cannot run the same conferencing application as the remote user device, in accordance with the principles of the present disclosure, a local user device running the same conferencing application as the remote user device may connect with the remote user device via the conferencing application and initiate a BYOM conference to share user device data with the remote user device. In one example, the user device may take control of one or more of the room peripheral devices from the UC&C platform room device via the wireless display receiver when the user device actively conducts the BYOM conference, as described in further detail below.

Figure 2A:
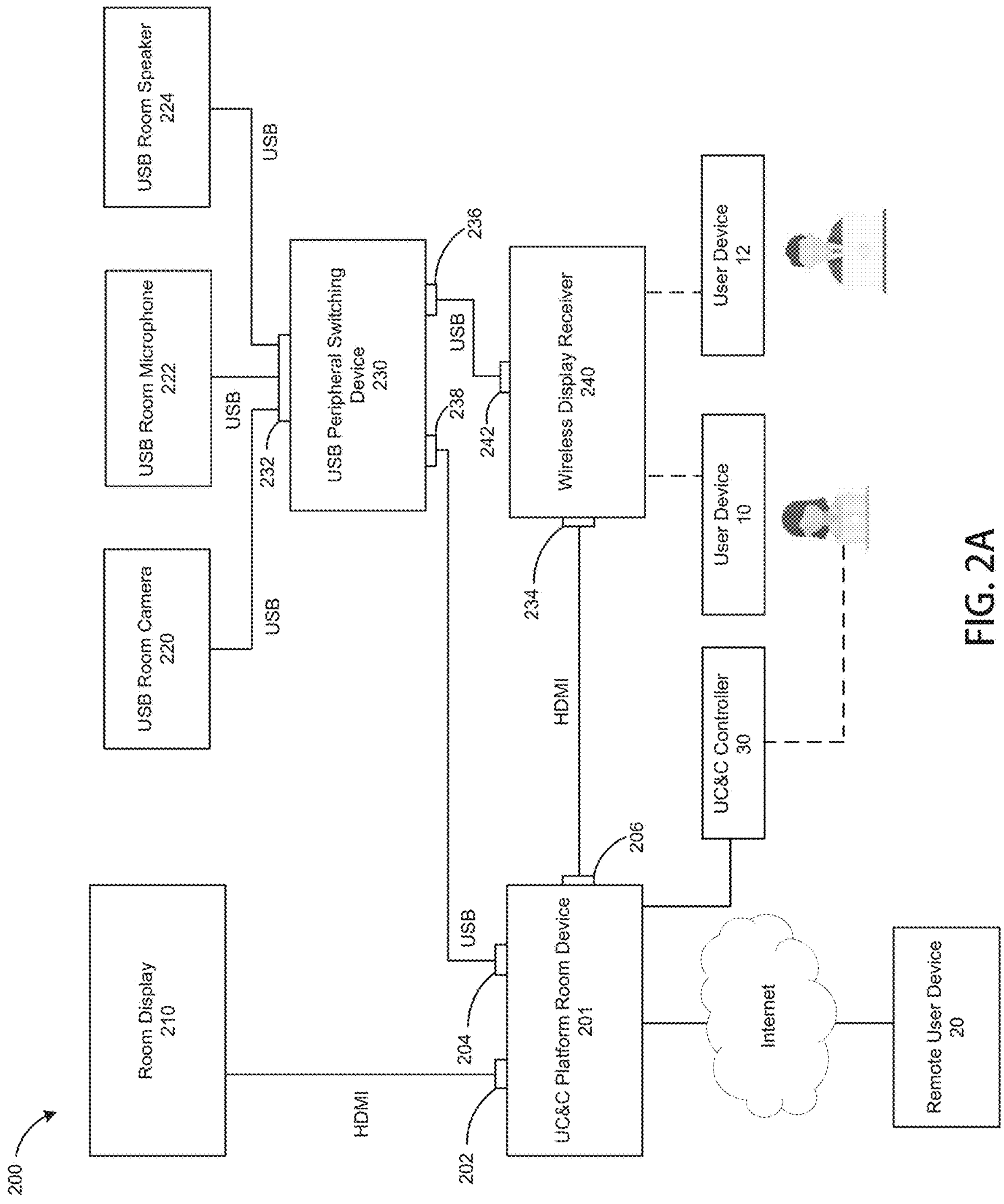
FIG. 2A illustrates an exemplary system for automatically sharing one or more room peripheral devices between a UC&C platform room device and a wireless display receiver constructed in accordance with the principles of the present disclosure.
Figure 2B:
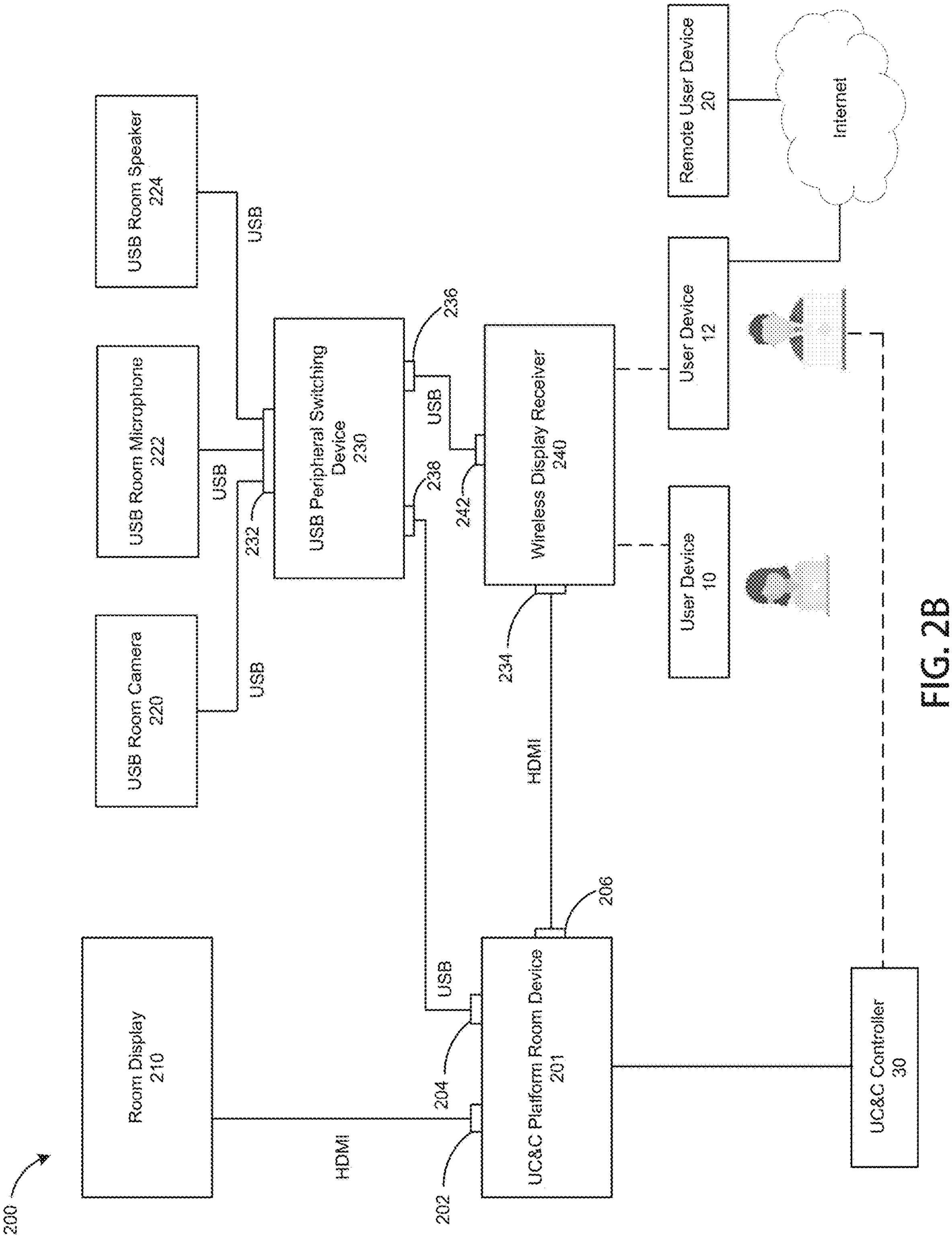
FIG. 2B illustrates the system of FIG. 2A during a BYOM conference.

Referring now to FIGS. 2A and 2B, an exemplary system for automatically sharing one or more room peripheral devices between a UC&C platform room device and a wireless display receiver is provided. As shown in FIGS. 2A and 2B, system 200 may include UC&C platform room device 201, which may be operated by a conference host user, e.g., via UC&C controller 30 operatively coupled to UC&C platform room device 201, and may be operatively coupled to room display 210 via HDMI output port 202, such that video data, e.g., image and audio data, may be transmitted from UC&C platform room device 201 to room display 210 via an HDMI connection, e.g., an HDMI cable. In addition, system 200 further may include USB peripheral switching device 230 and wireless display receiver 240. USB peripheral switching device 230 may be operatively coupled to one or more room peripheral devices, e.g., USB room camera 220, USB room microphone 222, and USB room speaker 224, via one or more device ports 232, such that data, including video data, may be transmitted between the one or more room peripheral devices and USB peripheral switching device 230 via one or more USB connections, e.g., USB cables.

Wireless display receiver 240 may include Miracast® capabilities as described in U.S. Pat. No. 10,560,499, the entire contents of which is incorporated herein by reference, such that data, including video data, from multiple user devices operatively coupled to wireless display receiver 240 may be selectively shared with the components of system 200. Wireless display receiver 240 may be operatively coupled to USB peripheral switching device 230, UC&C platform room device 201, and a plurality of user devices, e.g., user device 10, user device 12, etc., operated by one or more users, for transmitting data between the user devices and components of system 200. Each of the user devices must run a dedicated conferencing software application that facilitates communication between the respective user device and wireless display receiver 240, to thereby inform wireless display receiver 240 to launch the in-band control module to set its USB host port voltage to a threshold value, as described in further detail below.

As shown in FIGS. 2A and 2B, wireless display receiver 240 may be operatively coupled to UC&C platform room device 201 via HDMI output port 234 of wireless display receiver 240 and HDMI input port 206 of UC&C platform room device 201, such that video data, e.g., image and audio data, may be transmitted from wireless display receiver 240 to UC&C platform room device 201 via an HDMI connection, e.g., an HDMI cable. In addition, USB peripheral switching device 230 may be operatively coupled to UC&C platform room device 201 via USB port 204 of UC&C platform room device 201 and a host port of USB peripheral switching device 230, e.g., first host port 238, such that data may be transmitted between UC&C platform room device 201 and USB peripheral switching device 230 via a USB connection, e.g., USB cable. Moreover, USB peripheral switching device 230 may be operatively coupled to wireless display receiver 240 via USB port 242 of wireless display receiver 240 and another host port of USB peripheral switching device 230, e.g., second host port 236, such that data may be transmitted between wireless display receiver 240 and USB peripheral switching device 230 via a USB connection, e.g., USB cable.

Moreover, one or more remote user devices, e.g., remote user device 20, may be operatively coupled to UC&C platform room device 201 via an internet connection for transmitting and receiving data/video data during a UC&C conference, as described in further detail with regard to FIG. 2A, and/or one or more remote user devices, e.g., remote user device 20, may be operatively coupled to one or more user devices operatively coupled to wireless display receiver 240, e.g., user device 12, via an internet connection for transmitting and receiving data/video data during a BYOM conference, as described in further detail with regard to FIG. 2B. As will be understood by a person having ordinary skill in the art, more than two user devices may be operatively coupled to the wireless display receiver, such that any one of the user devices may initiate a BYOM conference and control the room peripheral devices and/or share content with system 200, e.g., via the dedicated conferencing software application.

As shown in FIG. 2A, a conference host user may initiate a UC&C conference to share content and control the one or more room peripheral devices by operating UC&C platform room device 201, e.g., via UC&C controller 30 operatively coupled to UC&C platform room device 201. For example, during the UC&C conference, the conference host user may share video data with room display 210 via UC&C platform room device 201 and with one or more remote user devices, e.g., remote user device 20, running the same conferencing application as UC&C platform room device 201 and operatively coupled to UC&C platform room device 201, e.g., over the internet. Specifically, during the UC&C conference, video data from USB room camera 220 may be transmitted to UC&C platform room device 201 via USB peripheral switching device 230 for transmission to room display 210 and remote user device 20, while UC&C platform room device 201 maintains control of the room peripheral devices. In addition, user device 10 also operated by the conference host user may be operatively coupled to wireless display receiver 240, such that user device 10 may selectively share content from a plurality of user devices connected to wireless display receiver 240, e.g., user device 12. For example, user device 10 may instruct wireless display receiver 240 to permit video data to be transmitted from any one of the user devices connected thereto to UC&C platform room device 201. Moreover, user device 10 may selectively share content from any one of the one or more remote user devices connected to UC&C platform room device 201 for transmission to room display 210.

When a remote user device is not running the same conferencing application as UC&C platform room device 201, a local user device running the same conferencing application as the remote user device and connected to wireless display receiver 240 may initiate a BYOM conference, such that control of the one or more room peripheral devices is automatically switched from UC&C platform room device 201 to wireless display receiver 240, and the local user device, e.g., the BYOM host user device, may share content between system 200 and the remote user device, while controlling the one or more room peripheral devices. For example, USB peripheral switching device 230 is configured to automatically switch control of the one or more room peripheral devices from UC&C platform room device 201 to wireless display receiver 240, and accordingly the BYOM host user device, e.g., user device 12, when user device 12 initiates and/or conducts a BYOM conference, as shown in FIG. 2B, e.g., via the dedicated conferencing software application. USB peripheral switching device 230 may automatically switch one or more device ports 232 to the newly activated host port, e.g., first host port 238 or second host port 236, such that USB peripheral switching device 230 either directs data between the one or more peripheral devices and UC&C platform room device 201 when first host port 238 is active, or between the one or more peripheral devices and wireless display receiver 240 when second host port 236 is active.

Wireless display receiver 240 may include a USB switch control module programmed to execute one or more algorithms stored in a memory of wireless display receiver 240 to set the power level of USB port 242 of wireless display receiver 240, e.g., via general purpose input/out (GPIO) pins, responsive to a command from the dedicated conferencing software application running on user device 12 that switches wireless display receiver 240 from an idle state to an active state upon initiation of the BYOM conference. For example, the command may cause the USB switch control module may set the power level of USB port 242 to a predetermined power threshold, e.g., 5 volts, when user device 12 initiates a BYOM conference (ON state), and to zero volts when user device 12 terminates the BYOM conference (OFF state). Moreover, second host port 236 of USB peripheral switching device 230 may become activated when the power signal in the USB connector associated with second host port 236 jumps from, e.g., zero volts to 5 volts, and may become inactive when the power signal in the USB connector associated with second host port 236 drops from, e.g., 5 volts to zero volts. As will be understood by a person having ordinary skill in the art, the predetermined power threshold may be another power level other than 5 volts. Further, second host port 236 may become activated when the power signal in the USB connector jumps from a non-zero volt power level to the predetermined power threshold, and may become inactive when the power signal in the USB connector drops from the predetermined power threshold to a lower non-zero volt power level.

Accordingly, prior to the initiation of a BYOM conference by user device 12, USB peripheral switching device 230 automatically switches one or more device ports 232 to first host port 238, such that UC&C platform room device 201 has control of the one or more room peripheral devices. As shown in FIG. 2A, during a UC&C conference, USB peripheral switching device 230 transmits data between the one or more room peripheral devices and UC&C platform room device 201 via USB connections, such that UC&C platform room device 201 has control of the one or more room peripheral devices, and system 200 transmits video data from UC&C platform room device 201 to room display 210 via an HDMI connection, and from UC&C platform room device 201 to remote user device 20 over an internet connection.

Referring again to FIG. 2B, when user device 12 initiates a BYOM conference, the dedicated conferencing software application causes wireless display receiver 240 to switch from an idle state to an active state, which causes the USB switch control module to set the power level of USB port 242 to the predetermined power threshold (ON state), e.g., 5 volts, such that second host port 236 is activated, and USB peripheral switching device 230 automatically switches one or more device ports 232 to second host port 236, such that user device 12 has control of the one or more room peripheral devices via wireless display receiver 240. During a BYOM conference, USB peripheral switching device 230 transmits data between the one or more room peripheral devices and wireless display receiver 240 via USB connections, and system 200 transmits video data from USB room camera 220 to wireless display receiver 240 via USB connections, and from wireless display receiver 240 to UC&C platform room device 201 and room display 210 via HDMI connections. Moreover, system 200 transmits data, including video data, between wireless display receiver 240 and user device 12, and between user device 12 and remote user device 20 via an internet connection. When user device 12 terminates the BYOM conference, the dedicated conferencing software application causes wireless display receiver 240 to switch from an active state to an idle state, which causes the USB switch control module to set the power level of USB port 242 to zero volts (OFF state), such that second host port 236 becomes inactive, and USB peripheral switching device 230 automatically switches one or more device ports 232 back to first host port 238, such that UC&C platform room device 201 again has control of the one or more room peripheral devices.

Moreover, instead of an out-of-band switch control that would require a separate serial cable coupling wireless display receiver 240 to USB peripheral switching device 230 to cause USB peripheral switching device 230 to initiate the host port switching action described above, the USB connection between wireless display receiver 240 and USB peripheral switching device 230 provides an in-of-band-switch control. Accordingly, USB peripheral switching device 230 may sense voltage associated with USB port 242 of wireless display receiver 240 to initiate the host port switching action over the same USB cable that carries data between wireless display receiver 240 and USB peripheral switching device 230. The in-of-band-switch control mechanism requires that USB peripheral switching device 230 is capable of sensing the USB voltage change at second host port 236 to automatically switch to the last activated host port, and that the host device, e.g., wireless display receiver 240 is capable of changing the USB voltage at its respective USB port. As will be understood by a person having ordinary skill in the art, all the systems described herein may incorporate the in-of-band-switch control mechanism.

Thus, USB peripheral switching device 230 is configured to sense the USB host port voltage, e.g., at second host port 236, and automatically switch to the last activated port, and wireless display receiver 240 is configured to intelligently control its USB port voltage to activate the switching action in USB peripheral switching device 230. Accordingly, when the USB switch control module of wireless display receiver 240 sets the power level of USB port 242 to the predetermined power threshold (ON state), the power level is automatically detected via the USB cable from wireless display receiver 240 to USB peripheral switching device 230 to switching device ports 232 to second host port 236, and when the USB switch control module of wireless display receiver 240 sets the power level of USB port 242 to zero (OFF state), the power level is automatically detected via the USB cable from wireless display receiver 240 to USB peripheral switching device 230 to switching device ports 232 to first host port 238. Other in-of-band-switch control mechanisms create auxiliary USB interfaces for the control plane on the same USB port of USB peripheral switching device 230, side-by-side the standard USB data interface. Examples of auxiliary USB interface for command and control include USB Serial Interface and USB Ethernet interface. Yet another in-of-band-switch control mechanism may send vendor specific USB Control data from wireless display receiver 240 to USB peripheral switching device 230 using the standard USB Control Transfers mechanism.

Figure 3:
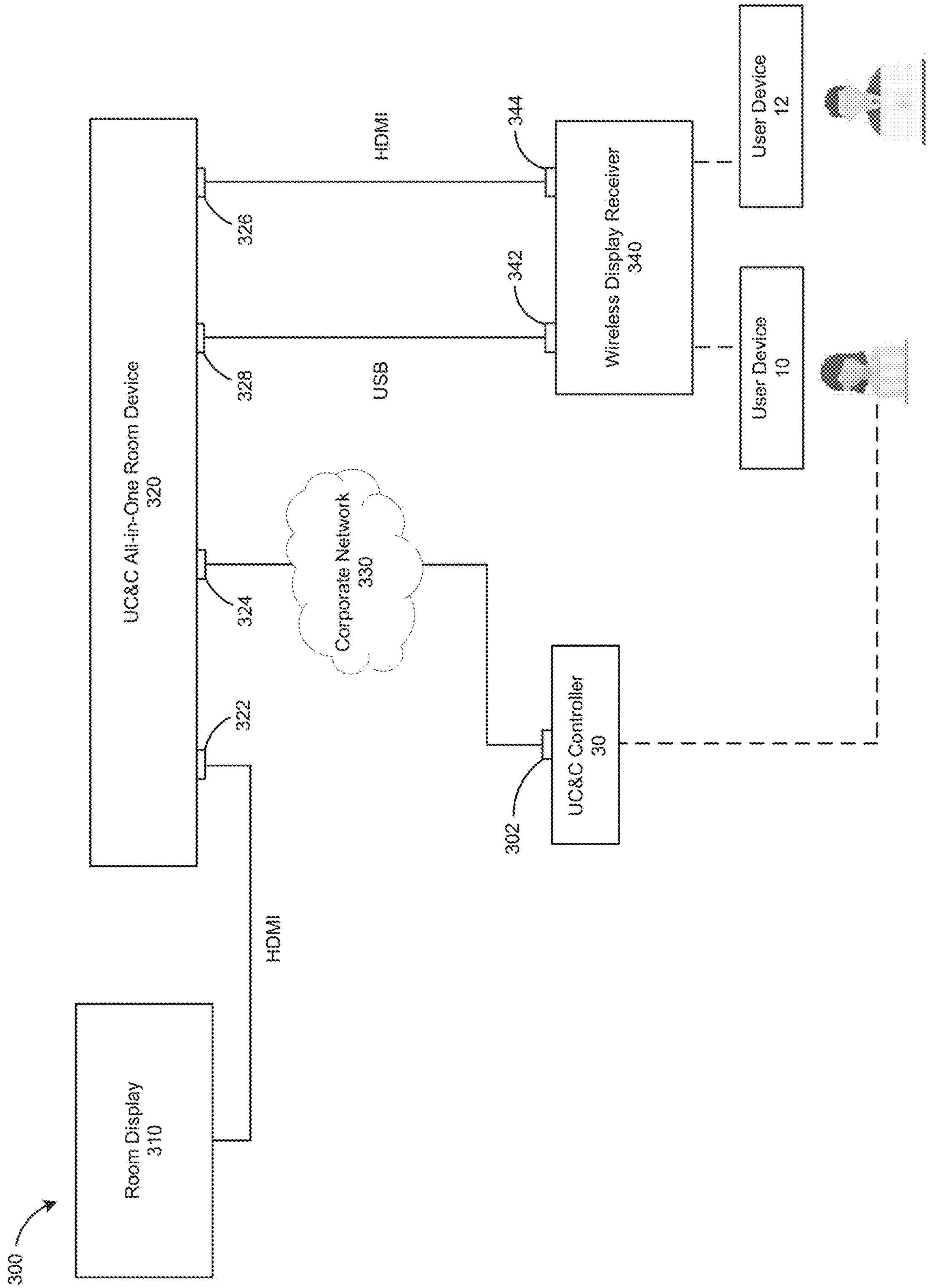
FIG. 3 illustrates an exemplary system for automatically sharing one or more room peripheral devices integrated in an all-in-one UC&C platform room device with a wireless display receiver constructed in accordance with the principles of the present disclosure.

Referring now to FIG. 3, an exemplary system for automatically sharing one or more room peripheral devices integrated in an all-in-one UC&C platform room device with one or more user devices is provided. As shown in FIG. 3, the one or more room peripheral devices, e.g., camera, microphone, speakers, compute module, etc., may be integrated with the UC&C platform room device in a single UC&C All-in-One (AIO) room device 320, e.g., a single video bar unit such the Logitech Rally Bar (made available by Logitech, Lausanne, Switzerland). A separate controller, e.g., UC&C controller 30, may be operatively coupled to UC&C AIO room device 320 via corporate network 330, e.g., an Ethernet network, for example via Ethernet port 302 of UC&C controller 30 and Ethernet port 324 of UC&C AIO room device 320, to serve as a controller for UC&C AIO room device 320 to provide functions such as conference calendar, remote user hook up, conference start/terminate, speaker volume control, camera pan/zoom/tilt, and other simple functions. For example, UC&C controller 30 may be a tablet operated by user 10. Alternatively, UC&C controller 30 may be operatively coupled to UC&C AIO room device 320 through a simple USB cable or an Ethernet cable.

As shown in FIG. 3, system 300 may include UC&C AIO room device 320, which may be operatively coupled to room display 310 via HDMI output port 322, such that video data, e.g., image and audio data, may be transmitted from UC&C AIO room device 320 to room display 310 via an HDMI connection, e.g., an HDMI cable. System 300 further may include wireless display receiver 340, which may be operatively coupled to a user device, e.g., user device 10 and/or user device 12, operated by one or more users for transmitting data between the user device and components of system 300. Each of the user devices must run a dedicated conferencing software application that facilitates communication between the respective user device and wireless display receiver 340. Accordingly, a user may share content and control the one or more room peripheral devices by operating UC&C AIO room device 320 via UC&C controller 30, or share content and control the one or more room peripheral devices by operating, e.g., user device 10 operatively coupled to wireless display receiver 340.

As shown in FIG. 3, wireless display receiver 340 may be operatively coupled to UC&C AIO room device 320 via HDMI output port 344 of wireless display receiver 340 and HDMI input port 326 of UC&C AIO room device 320, such that video data may be transmitted from wireless display receiver 340 to UC&C AIO room device 320 via an HDMI connection, e.g., an HDMI cable. Moreover, UC&C AIO room device 320 may be operatively coupled to wireless display receiver 340 via USB port 342 of wireless display receiver 340 and USB port 328 of UC&C AIO room device 320 such that data may be transmitted between wireless display receiver 340 and UC&C AIO room device 320 via a USB connection, e.g., USB cable. When user device 12 terminates the BYOM conference, the dedicated conferencing software application causes wireless display receiver 340 to inactivate both USB port 342 and HDMI output port 344.

Like wireless display device 240, wireless display receiver 340 may include a USB switch control module programmed to execute one or more algorithms stored in a memory of wireless display receiver 340 to set the power level of USB port 342 and HDMI output port 344 of wireless display receiver 340, e.g., via general purpose input/out (GPIO) pins. Specifically, wireless display receiver 340 may manipulate the voltage signal in the HDMI connection between HDMI output port 344 and HDMI input port 326 as well as the USB connection between USB ports 342, 328 according to a sequence and timing specific to the make and model of UC&C AIO room device 320, to trigger UC&C AIO room device 320 to automatically switch between an "appliance mode" where UC&C controller 30 has control of the one or more room peripheral devices and wireless display receiver 340 is in an idle state, and a "device mode" where the BYOM host user device, e.g., user device 12, has control of the one or more room peripheral devices via wireless display receiver 340 and wireless display receiver 340 is in an active state, e.g., when user device 12 initiates and/or conducts a BYOM conference. Accordingly, UC&C AIO room device 320 may automatically switch to the newly activated host ports, such that data is either directed within UC&C AIO room device 320 when USB port 328 and HDMI input port 326 are idle, or between UC&C AIO room device 320 and wireless display receiver 340 when USB port 328 and HDMI input port 326 are active.

Accordingly, prior to the initiation of a BYOM conference by user device 12, wireless display receiver 340 causes UC&C AIO room device 320 to automatically inactivate both USB port 328 and HDMI input port 326, such that UC&C controller 30 has control of the one or more room peripheral devices inside UC&C AIO room device 320. In appliance mode, video data is transmitted from UC&C AIO room device 320 to room display 310 via an HDMI connection. When user device 12 initiates a BYOM conference, the dedicated conferencing software application of user device 12 will trigger wireless display receiver 340 to launch the USB switch control module which may set the power level of USB port 342 and HDMI output port 344 of the wireless display receiver 340 to a predetermined sequence of power levels (ON state), e.g., 5 volts or (OFF state), e.g., 0 volts respectively, such that USB port 328 and HDMI input port 326 are activated, and UC&C AIO room device 320 automatically switches to USB port 328 and HDMI input port 326, such that user device 12 has control of the one or more room peripheral devices inside UC&C AIO room device 320 via wireless display receiver 340. In device mode, data is transmitted between UC&C AIO room device 320 and wireless display receiver 340 via USB connections, and video data is transmitted from wireless display receiver 340 to UC&C AIO room device 320 and room display 310 via HDMI connections. Moreover, video data is transmissible between the BYOM host user device, e.g., user device 12, and one or more remote devices connected to user device 12 (not shown) over an internet connection. When user device 12 terminates the BYOM conference, the dedicated conferencing software application of user device 12 will trigger wireless display receiver 340 to launch the USB switch control module which may set the power level of USB port 342 and HDMI output port 344 of the wireless display receiver 340 to another predetermined sequence of power levels respectively, such that USB port 328 and HDMI input port 326 become inactive, and UC&C controller 30 automatically has control of UC&C AIO room device 320 again.

Figure 4A:
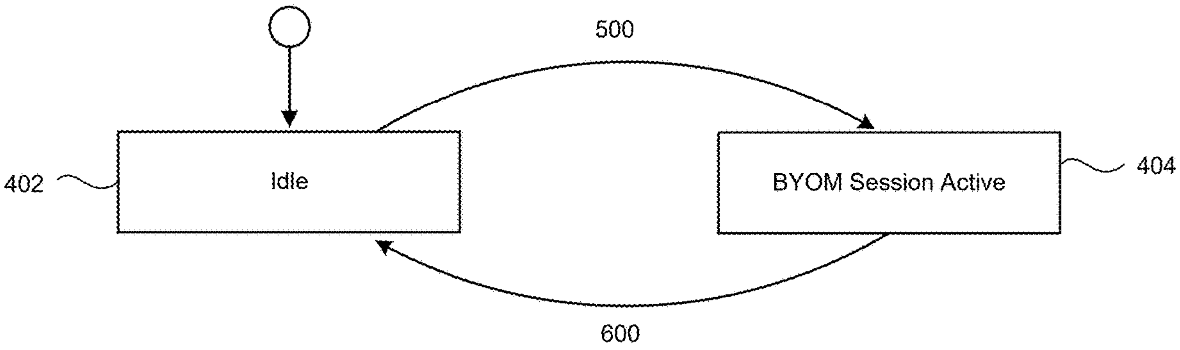
FIG. 4A is a flow chart illustrating automatic switching of a wireless display receiver between an idle mode and an active session in accordance with the principles of the present disclosure.
Figure 4B:
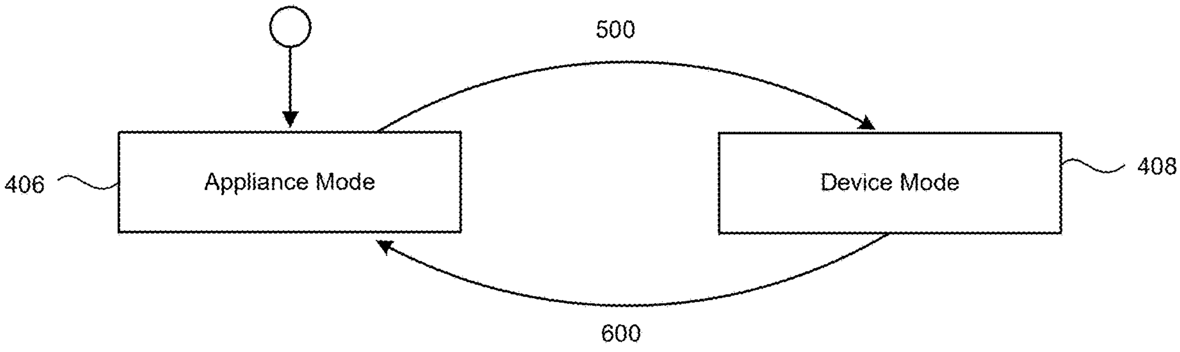
FIG. 4B is a flow chart illustrating automatic switching of a UC&C platform room device between an appliance mode and a device mode in accordance with the principles of the present disclosure.

FIGS. 4A and 4B are flow charts illustrating the automatic switching mechanisms of the wireless display receiver, e.g., wireless display receiver 340, and a UC&C room device, e.g., UC&C AIO room device 320, respectively, when a user initiates and terminates a BYOM conference via a user device. When a BYOM conference is initiated by user device 12 in system 300, wireless display receiver 340 must create the right combination of states at USB port 342 and HDMI output port 344 to facilitate UC&C AIO room device 320 to automatically switch to the device mode. The USB switch control module of wireless display receiver 340 relies on a database of rules, indexed by the USB Vendor ID and Product ID of UC&C AIO room device 320, for setting the correct state of USB port 342 and HDMI output port 344 to trigger UC&C AIO room device 320 to automatically switch between the appliance mode and the device mode. For example, there may be two rules for each (PID, VID): one for switching to the device mode, and one for switching to the appliance mode.

As shown in FIG. 4A, when wireless display receiver 340 is in the idle state at step 402, the user device has not initiated a BYOM conference. While wireless display receiver 340 is in the idle state, UC&C AIO room device 320 is in the appliance mode at step 406, as shown in FIG. 4B. Accordingly, upon initiation of a BYOM conference by the user device, the USB switch control module of wireless display receiver 340 may apply switch-to-the-device-mode rule 500, as described in further detail below with regard to FIG. 5, to enter the BYOM session active state at step 404. While wireless display receiver 340 is in the BYOM session active state, UC&C AIO room device 320 is in the device mode at step 408, as shown in FIG. 4B. Moreover, upon termination of the BYOM conference by the user device, the USB switch control module of wireless display receiver 340 may apply switch-to-appliance-mode rule 600 at step 404, as described in further detail below with regard to FIG. 6, to exit the BYOM session active state and return to the idle state at step 402. Concurrently, UC&C AIO room device 320 automatically switches from device mode at step 408 back to appliance mode at step 406.

An example of switch-to-the-device-mode rule 500 for VID/PID (0x046D, 0x123): {UsbPwr=Low, HdmiOutPwr=Low, WaitSec=3, UsbPwr=High, HdmiOutPwr=High}, and an example of switch-to-appliance-mode rule 600 for VID/PID (0x046D, 0x123): {UsbPwr=Low, HdmiOutPwr=Low}. The rules are stored in the database in the JSON format.

Figure 5:
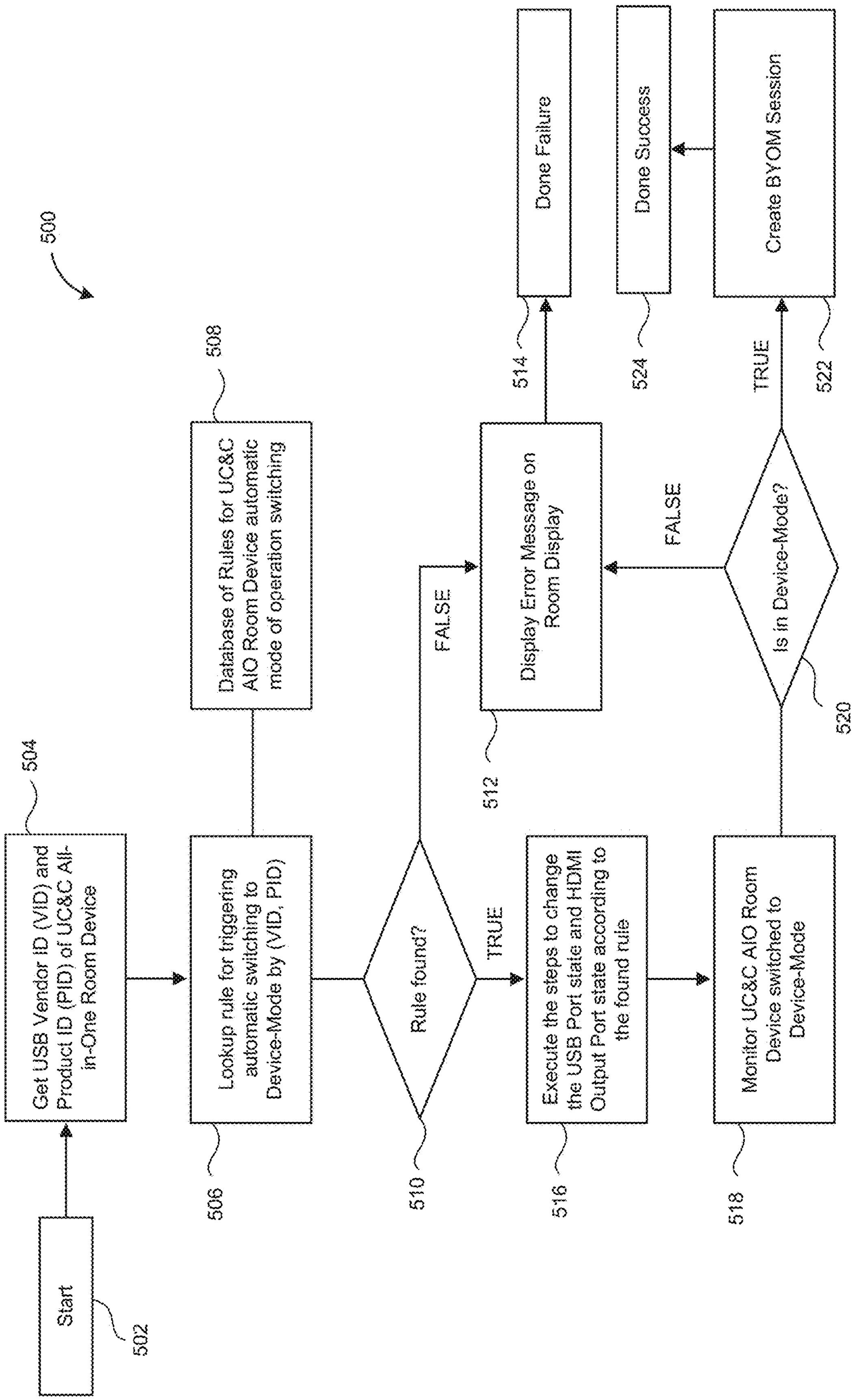
FIG. 5 is a flow chart illustrating initiation of a BYOM conference in accordance with the principles of the present disclosure.

Referring now to FIG. 5, switch-to-the-device-mode rule 500 is described. Switch-to-the-device-mode rule 500 starts at step 502. At step 504, the USB switch control module of wireless display receiver 340 retrieves the USB Vendor ID (VID) and Product ID (PID) of UC&C AIO room device 320. At step 506, the USB switch control module looks up a rule for triggering automatic switching to the device mode by (VID, PID) within database 508, which is a database of rules for automatic mode of operation switching for UC&C AIO room device 320. At step 510, the USB switch control module determines whether the rule for triggering automatic switching to the device mode was found in database 508. If the rule is not found, at step 512, the USB switch control module causes room display 310 to display an error message, and rule 500 fails at step 514. If the rule is found, at step 516, the USB switch control module executes the steps to change the state of USB port 342 and HDMI output port 344 according to the found rule. At step 518, the USB switch control module monitors UC&C AIO room device 320 switched to the device mode. At step 520, the USB switch control module determines whether UC&C AIO room device 320 is in the device mode. If UC&C AIO room device 320 is not in the device mode, the USB switch control module causes room display 310 to display an error message, and rule 500 fails at step 514. If UC&C AIO room device 320 is in the device mode, at step 522, the USB switch control module creates a BYOM conference initiated by the user device, and rule 500 succeeds at step 524.

Figure 6:
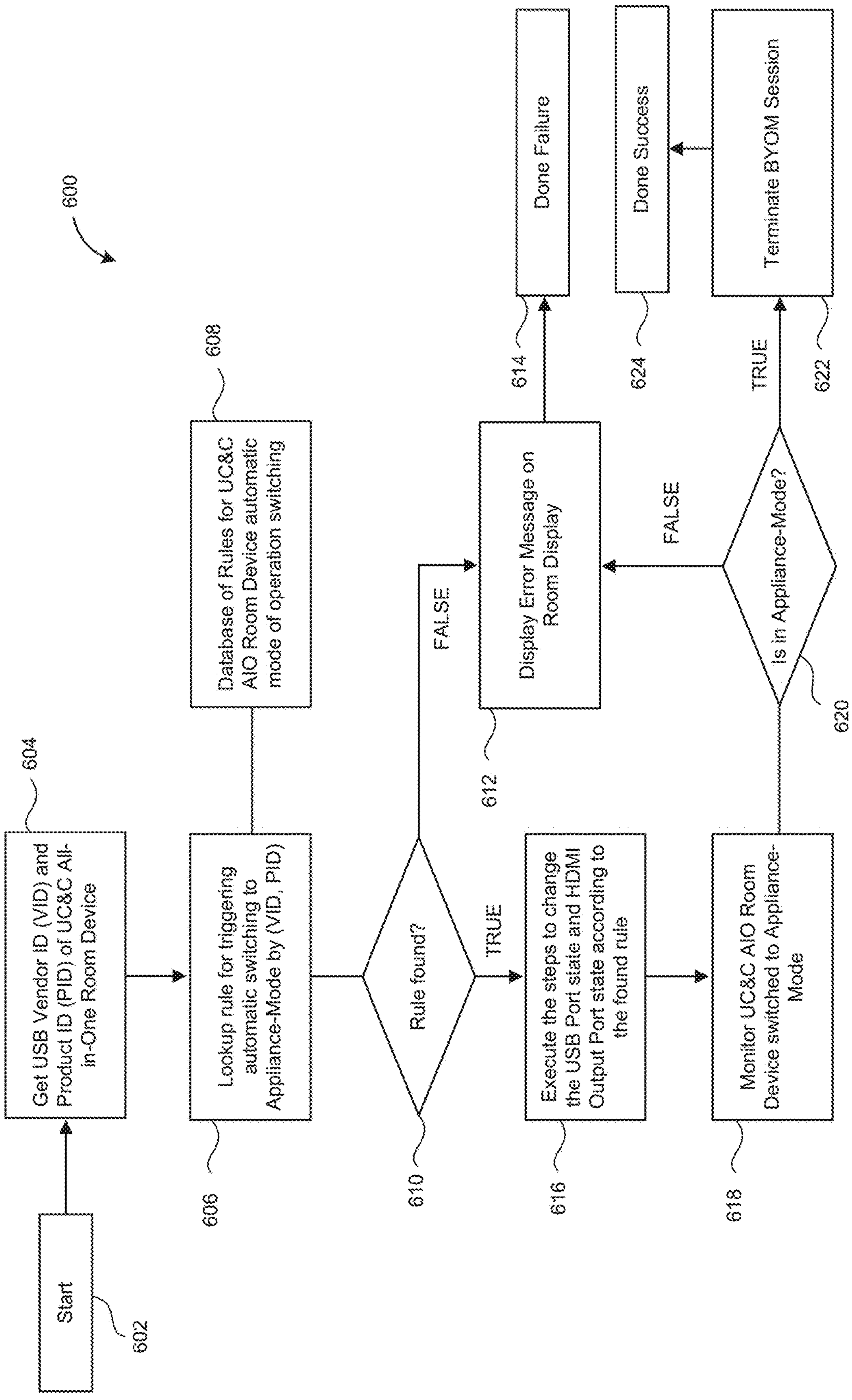
FIG. 6 is a flow chart illustrating termination of a BYOM conference in accordance with the principles of the present disclosure.

Referring now to FIG. 6, switch-to-the-appliance-mode rule 600 is described. Switch-to-the-appliance-mode rule 600 starts at step 602. At step 604, the USB switch control module of wireless display receiver 340 retrieves the USB VID and PID of UC&C AIO room device 320. At step 606, the USB switch control module looks up a rule for triggering automatic switching to the appliance mode by (VID, PID) within database 608, which is a database of rules for automatic mode of operation switching for UC&C AIO room device 320. At step 610, the USB switch control module determines whether the rule for triggering automatic switching to the appliance mode was found in database 608. If the rule is not found, at step 612, the USB switch control module causes room display 310 to display an error message, and rule 600 fails at step 614. If the rule is found, at step 616, the USB switch control module executes the steps to change the state of USB port 342 and HDMI output port 344 according to the found rule. At step 618, the USB switch control module monitors UC&C AIO room device 320 switched to the appliance mode. At step 620, the USB switch control module determines whether UC&C AIO room device 320 is in the appliance mode. If UC&C AIO room device 320 is not in the appliance mode, the USB switch control module causes room display 310 to display an error message, and rule 600 fails at step 614. If UC&C AIO room device 320 is in the appliance mode, at step 622, the USB switch control module terminates the BYOM conference, and rule 600 succeeds at step 624.

Figure 7A:
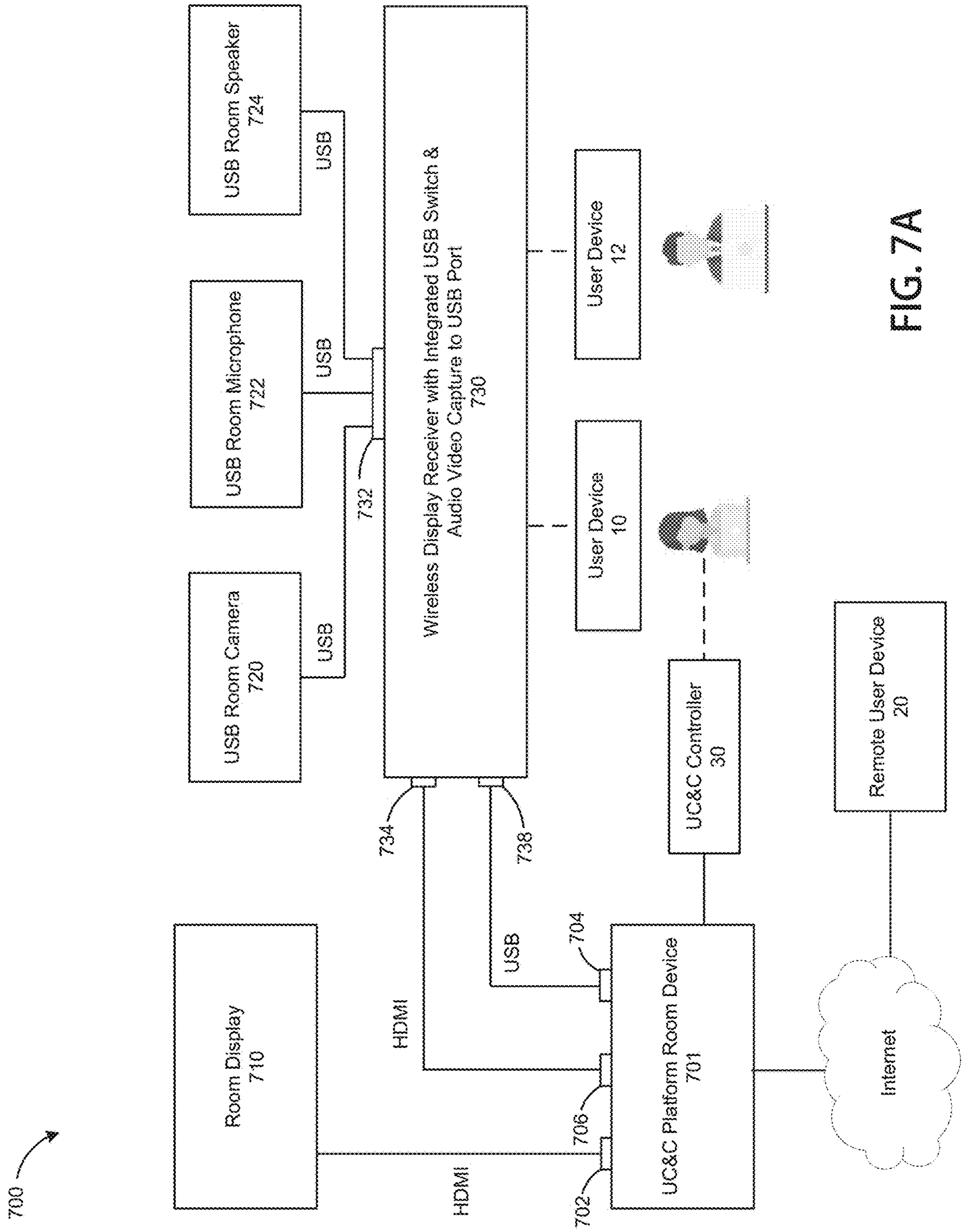
FIG. 7A illustrates another exemplary system for automatically sharing one or more room peripheral devices between a UC&C platform room device and an All-in-One (AIO) receiver device constructed in accordance with the principles of the present disclosure.
Figure 7B:
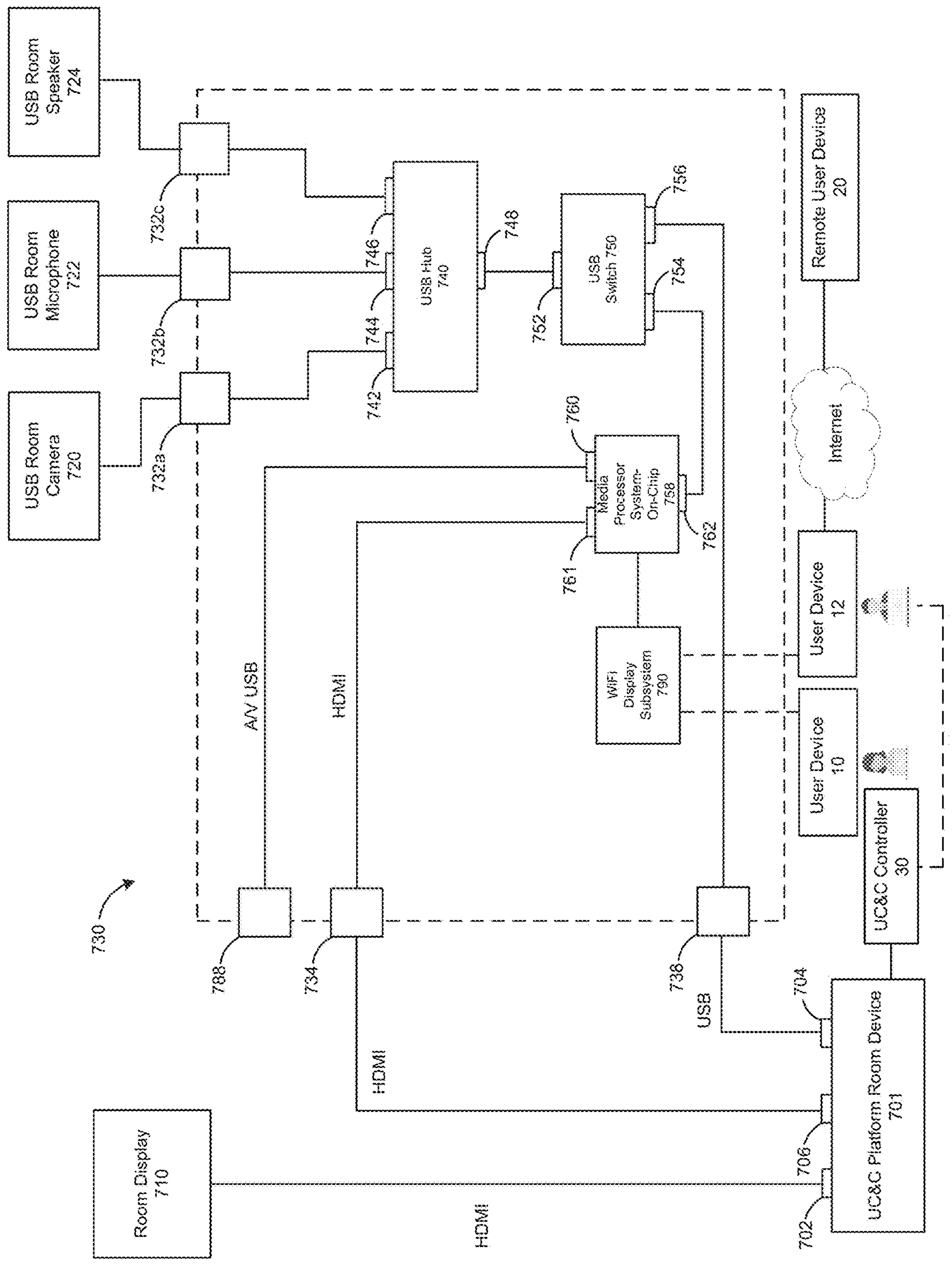
FIG. 7B is a schematic of sample internal components of the All-in-One (AIO) receiver of the system of FIG. 7A.

Referring now to FIGS. 7A and 7B, another exemplary system for automatically sharing one or more room peripheral devices between a UC&C platform room device, e.g., a Microsoft Teams Room device or a custom Compute Device, and a local user device, e.g., a BYOM host user device, is provided. As shown in FIG. 7A, system 700 may include UC&C platform room device 701 and a wireless display receiver with integrated USB switch and audio video capture to USB port, e.g., All-in-One (AIO) receiver 730, which may be operatively coupled to a plurality of user devices, e.g., user device 10, user device 12, etc., operated by one or more users for transmitting data between the user devices and components of system 700. As described above, each of the user devices must run a dedicated conferencing software application that facilitates communication between the respective user device and AIO receiver 730. Advantageously, AIO receiver 730 reduces the amount of USB cables required to connect components within system 700, thereby reducing clutter of equipment, e.g., no separate USB switch, USB audio & video capture card, etc. While FIG. 7A illustrates remote user device 20 operatively coupled to UC&C platform room device 701 via an internet connection for transmitting and receiving data/video data during a UC&C conference and FIG. 7B illustrates remote user device 20 operatively coupled to one or more user devices operatively coupled to AIO receiver 730, e.g., user device 12, via an internet connection for transmitting and receiving data/video data during a BYOM conference, as will be understood by a person having ordinary skill in the art, the systems illustrated in FIGS. 7A and 7B are each capable of conducting both a UC&C conference and a BYOM conference.

As shown in FIG. 7A, AIO receiver 730 may be operatively coupled to one or more room peripheral devices, e.g., USB room camera 720, USB room microphone 722, and USB room speaker 724, via one or more device ports 732, such that data may be transmitted between the one or more room peripheral devices and AIO receiver 730 via one or more USB connections, e.g., USB cables. In addition, AIO receiver 730 may be operatively coupled to UC&C platform room device 701 via HDMI output port 734 of AIO receiver 730 and HDMI input port 706 of UC&C platform room device 701, such that video data, e.g., image and audio data, may be transmitted from AIO receiver 730 to UC&C platform room device 701 via an HDMI connection, e.g., an HDMI cable, and AIO receiver 730 may be operatively coupled to UC&C platform room device 701 via USB switch output port 738 of AIO receiver 730 and USB port 704 of UC&C platform room device 701, such that data may be transmitted between UC&C platform room device 701 and AIO receiver 730 via a USB connection, e.g., USB cable. Moreover, UC&C platform room device 701 may be operatively coupled to room display 710 via HDMI output port 702 of UC&C platform room device 701, such that video data may be transmitted from UC&C platform room device 701 to room display 710 via an HDMI connection, e.g., an HDMI cable. In addition, data, including video data, may be transmitted between UC&C platform room device 701 and one or more remote devices connected to UC&C platform room device 701, e.g., remote user device 20 via an internet connection during a UC&C conference, as shown in FIG. 7A. During the UC&C conference, data, including video data, such as from USB room camera 720 may be transmitted to UC&C platform room device 701 and to room display 710.

When a remote user device is not running the same conferencing application as UC&C platform room device 701, a local user device running the same conferencing application as the remote user device and connected to AIO receiver 730 may initiate a BYOM conference, such that control of the one or more room peripheral devices is automatically switched from UC&C platform room device 701 to AIO receiver 730, and the local user device, e.g., the BYOM host user device, may share content between system 700 and the remote user device, while controlling the one or more room peripheral devices. Like USB peripheral switching device 230, AIO receiver 730 is configured to automatically switch control of the one or more room peripheral devices between UC&C platform room device 701 and AIO receiver 730, and accordingly the BYOM host user device, e.g., user device 12, as shown in FIG. 7B, responsive to a command from the dedicated conferencing software application. For example, AIO receiver 730 may include a USB switch control module programmed to execute one or more algorithms stored in a memory of AIO receiver 730 to determine whether the BYOM conference is active. Accordingly, AIO receiver 730 may either direct data between the one or more peripheral devices and user device 12 when the BYOM conference is active, or between the one or more peripheral devices and UC&C platform room device 701 when the BYOM conference is terminated.

Accordingly, prior to the initiation of a BYOM conference by user device 12, AIO receiver 730 automatically switches control of the one or more room peripheral devices to UC&C platform room device 701. During a UC&C conference, AIO receiver 730 transmits data between the one or more room peripheral devices and UC&C platform room device 701 via USB connections, such that UC&C platform room device 701 has control of the one or more room peripheral devices, and system 700 transmits video data from UC&C platform room device 701 to room display 710 via an HDMI connection, and from UC&C platform room device 701 to remote user device 20 over an internet connection, as shown in FIG. 7A. When user device 12 initiates a BYOM conference, AIO receiver 730 automatically switches control of the one or more room peripheral devices to user device 12. During the BYOM conference, AIO receiver 730 transmits data between the one or more room peripheral devices and user device 12 via USB connections and a wireless connection, and AIO receiver 730 transmits video data from user device 12 to UC&C platform room device 701, and accordingly room display 710, via a wireless connection and HDMI connections. Moreover, system 700 transmits data, including video data, between AIO receiver 730 and user device 12, and between user device 12 and remote user device 20 via an internet connection, as shown in FIG. 7B. When user device 12 terminates the BYOM conference, AIO receiver 730 automatically switches control of the one or more room peripheral devices back to UC&C platform room device 701.

FIG. 7B illustrates the internal components of AIO receiver 730. As described above, during a UC&C conference, UC&C platform room device 701 has control of the one or more room peripheral devices, and during a BYOM conference, user device 12 has control of the one or more room peripheral devices via AIO receiver 730. As described above, during a UC&C conference, data may be transmitted between UC&C platform room device 701, AIO receiver 730, and the one or more room peripheral devices via one or more USB connections, and video data may be transmitted from USB room camera 720 to AIO receiver 730 via a USB connection, from AIO receiver 730 to UC&C platform room device 701 via an HDMI connection, from UC&C platform room device 701 to room display 710 via an HDMI connection. Specifically, referring to FIG. 7B, data may be directed from the one or more room peripheral devices, e.g., USB room camera 720, USB room microphone 722, and USB room speaker 724, to UC&C platform room device 701 via one or more device ports, e.g., device ports 732*a*, 732*b*, 732*c* of AIO receiver 730, respectively, ports 742, 744, 746 of USB hub 740, respectively, port 748 of USB hub 740, hub port 752 of USB switch 750, host port 756 of USB switch 750, USB switch output port 738 of AIO receiver 730, and USB port 704 of UC&C platform room device 701.

Moreover, video data may be directed from one or more room peripheral devices, e.g., USB room camera 720, to UC&C platform room device 701 via device port 732*a* of AIO receiver 730, port 742 of USB hub 740, port 748 of USB hub 740, hub port 752 of USB switch 750, host port 756 of USB switch 750, USB switch output port 738 of AIO receiver 730, and USB port 704 of UC&C platform room device 701, and from a plurality of user devices connected to AIO receiver 730, e.g., user device 12, to UC&C platform room device 701 via a wireless connection between user device 12 and WiFi display subsystem 790, HDMI output port 761 of media processor system-on-chip 758, HDMI output port 734 of AIO receiver 730, and HDMI input port 706 of UC&C platform room device 701, and from UC&C platform room device 701 to room display 710 via HDMI output port 702 of UC&C platform room device 701 and an HDMI input port of room display 710. As will be understood by a person having ordinary skill in the art, media processor system-on-chip 758 is programmed to process and merge input data, e.g., converting data received from USB switch 750 and/or WiFi display subsystem 790 to various output formats such as audio video USB and HDMI. Accordingly, UC&C platform room device 701 may share data, including video data, received by UC&C platform room device 701 from the remote user device, e.g., screen share, such that the remote user device can see the USB room camera's screen, and/or the screen of any user device connected to AIO receiver 730 selected by the user 10, e.g., UC&C conference host user device.

As described above, during a BYOM conference, data may be transmitted between the BYOM host user device, e.g., user device 12, AIO receiver 730, and the one or more room peripheral devices via a wireless connection and one or more USB connections, and video data may be transmitted from USB room camera 720 to AIO receiver 730 via a USB connection, between one or more remote devices connected to user device 12, e.g., remote user device 20, and user device 12 over an internet connection, from user device 12 to AIO receiver 730 via a wireless connection, and from AIO receiver 730 to UC&C platform room device 701 and room display 710 via HDMI connections. Specifically, referring to FIG. 7B, data may be directed from the one or more room peripheral devices, e.g., USB room camera 720, USB room microphone 722, and USB room speaker 724, to user device 12 via one or more device ports, e.g., device ports 732*a*, 732*b*, 732*c* of AIO receiver 730, respectively, ports 742, 744, 746 of USB hub 740, respectively, port 748 of USB hub 740, hub port 752 of USB switch 750, host port 754 of USB switch 750, USB input port 762 of media processor system-on-chip 758, and a wireless connection between user device 12 and WiFi display subsystem 790.

However, video data may be directed from one or more remote user devices connected to user device 12, e.g., remote user device 20, and/or a plurality of user devices connected to AIO receiver 730, e.g., user device 10, to room display 710 via a wireless connection between user devices 10, 12 and WiFi display subsystem 790, HDMI output port 761 of media processor system-on-chip 758, HDMI output port 734 of AIO receiver 730, HDMI input port 706 of UC&C platform room device 701, HDMI output port 702 of UC&C platform room device 701, and an HDMI input port of room display 710. As shown in FIG. 7B, AIO receiver 730 may include USB audio & video (A/V) output port 788 operatively coupled to USB audio & video (A/V) output port 760 of media processor system-on-chip 758 for transmitting video data, as described in further detail below with regard to FIG. 8B. Thus, the BYOM host user device may share data, including video data, with other remote user devices running the same conferencing application as the BYOM host user device.

In some embodiments, UC&C platform room device 701 may not require an HDMI input port, which may be the case when a user puts the UC&C room system together DIY-style using a regular PC, which generally does not have built-in HDMI input ports. Systems such as system 200 described above may operate with a UC&C platform room device that does not have an HDMI input port by using an HDMI-to-USB capture card, such that an HDMI cable may be coupled to HDMI output port 234 of wireless display receiver 240 and to the HDMI-to-USB capture card, and a USB cable may be coupled to the HDMI-to-USB capture card and to the USB port of the UC&C platform room device.

Figure 8A:
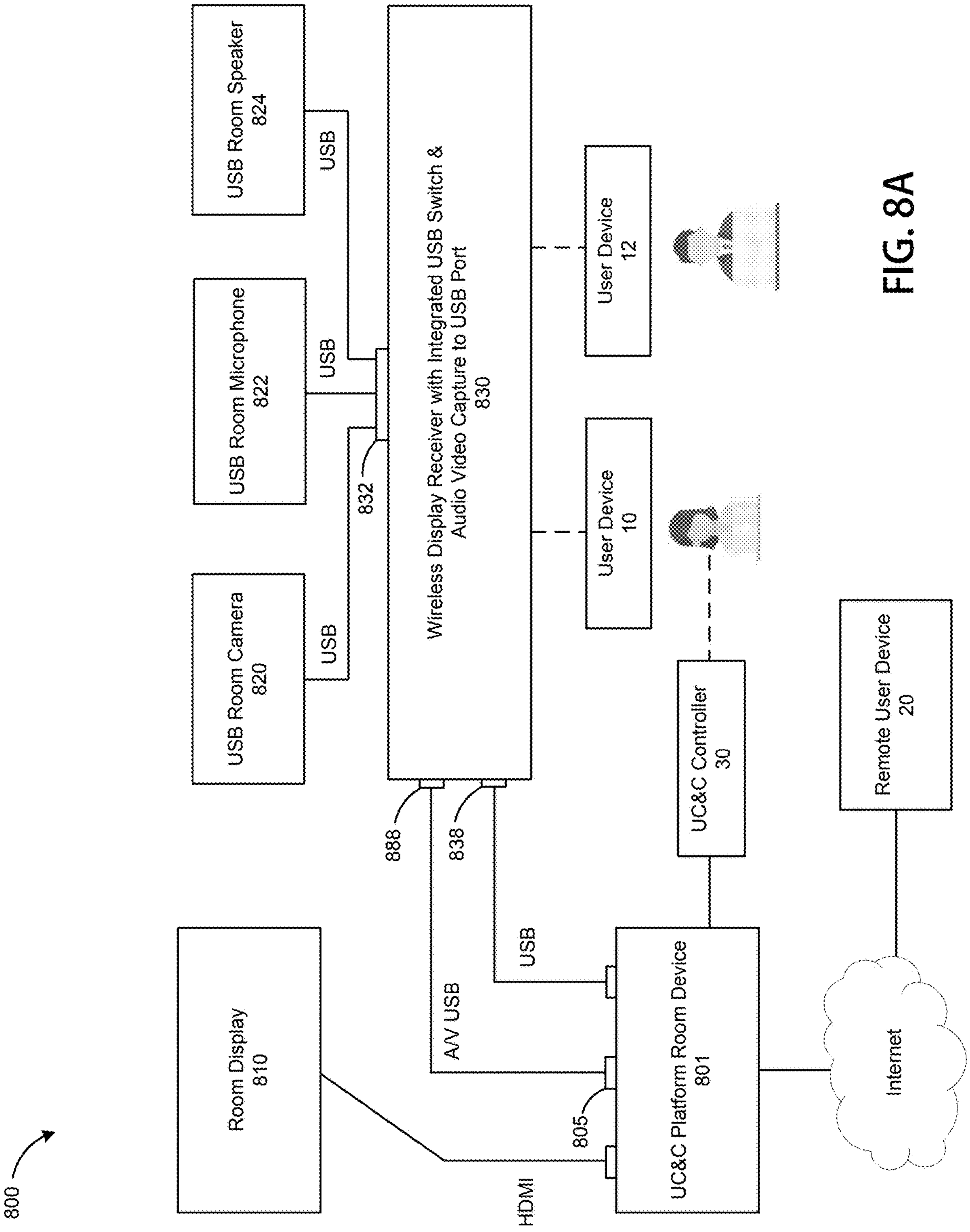
FIG. 8A illustrates another exemplary system for automatically sharing one or more room peripheral devices between a UC&C platform room device having an HDMI equivalent USB audio/video input and an All-in-One (AIO) receiver device constructed in accordance with the principles of the present disclosure.
Figure 8B:
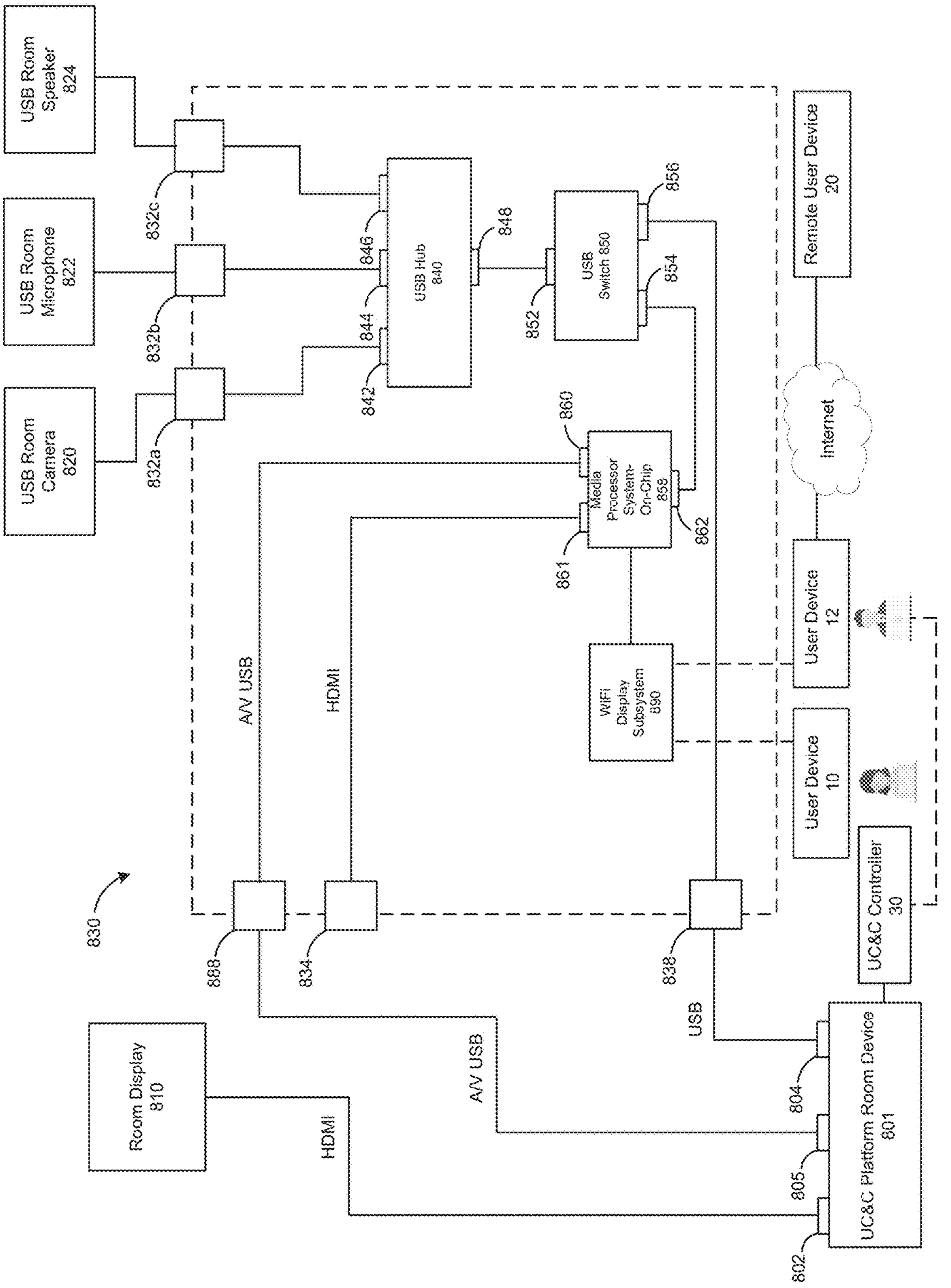
FIG. 8B is a schematic of sample internal components of the All-in-One (AIO) receiver device of the system of FIG. 8A.

Referring now to FIGS. 8A and 8B, another exemplary system for automatically sharing one or more room peripheral devices between a UC&C platform room device, e.g., a desktop PC, and one or more user devices is provided. System 800 may be constructed similar to system 700. For example, room display 810, USB room camera 820, USB room microphone 822, USB room speaker 824, and All-in-One (AIO) receiver 830 correspond with room display 710, USB room camera 720, USB room microphone 722, USB room speaker 724, and All-in-One (AIO) receiver 730. Accordingly, device ports 832*a*, 832*b*, 832*c*, USB switch output port 838, HDMI output port 834, and USB audio & video (A/V) output port 888 of AIO receiver 830, USB hub 840 having ports 842, 844, 846, 848, USB switch 850 having hub port 852 host ports 854, 856, media processor system-on-chip 858 having USB audio & video (A/V) output port 860, HDMI output port 861, and USB input port 862, and WiFi display subsystem 890 correspond with device ports 732*a*, 732*b*, 732*c*, USB switch output port 738, HDMI output port 734, and USB audio & video (A/V) output port 788 of AIO receiver 730, USB hub 740 having ports 742, 744, 746, 748, USB switch 750 having hub port 752 host ports 754, 756, media processor system-on-chip 758 having USB audio & video (A/V) output port 760, HDMI output port 761, and USB input port 762, and WiFi display subsystem 790. System 800 differs from system 700 in that UC&C platform room device 801 may not include an HDMI input port. Instead, UC&C platform room device 801 includes USB audio & video (A/V) input port 805, such that audio and video data may be transmitted between UC&C platform room device 801 and AIO receiver 830 via a USB connection, e.g., USB cable.

Accordingly, during both a UC&C conference where AIO receiver 830 shares control of the room peripheral devices with UC&C platform room device 801 and a BYOM conference where AIO receiver 830 shares control of the room peripheral devices with the BYOM host user device, e.g., user device 12, video data may be directed from a plurality of user devices connected to AIO receiver 830, e.g., user devices 10, 12, to UC&C platform room device 801 via a wireless connection between user devices 10, 12 and WiFi display subsystem 890, USB audio & video (A/V) output port 860 of media processor system-on-chip 858, USB audio & video (A/V) output port 888 of AIO receiver 830, and USB audio & video (A/V) input port 805. Other data flow through system 800 corresponds with the data flow through system 700 described above. While FIG. 8A illustrates remote user device 20 operatively coupled to UC&C platform room device 801 via an internet connection for transmitting and receiving data/video data during a UC&C conference and FIG. 8B illustrates remote user device 20 operatively coupled to one or more user devices operatively coupled to AIO receiver 830, e.g., user device 12, via an internet connection for transmitting and receiving data/video data during a BYOM conference, as will be understood by a person having ordinary skill in the art, the systems illustrated in FIGS. 8A and 8B are each capable of conducting both a UC&C conference and a BYOM conference.

Figure 9:
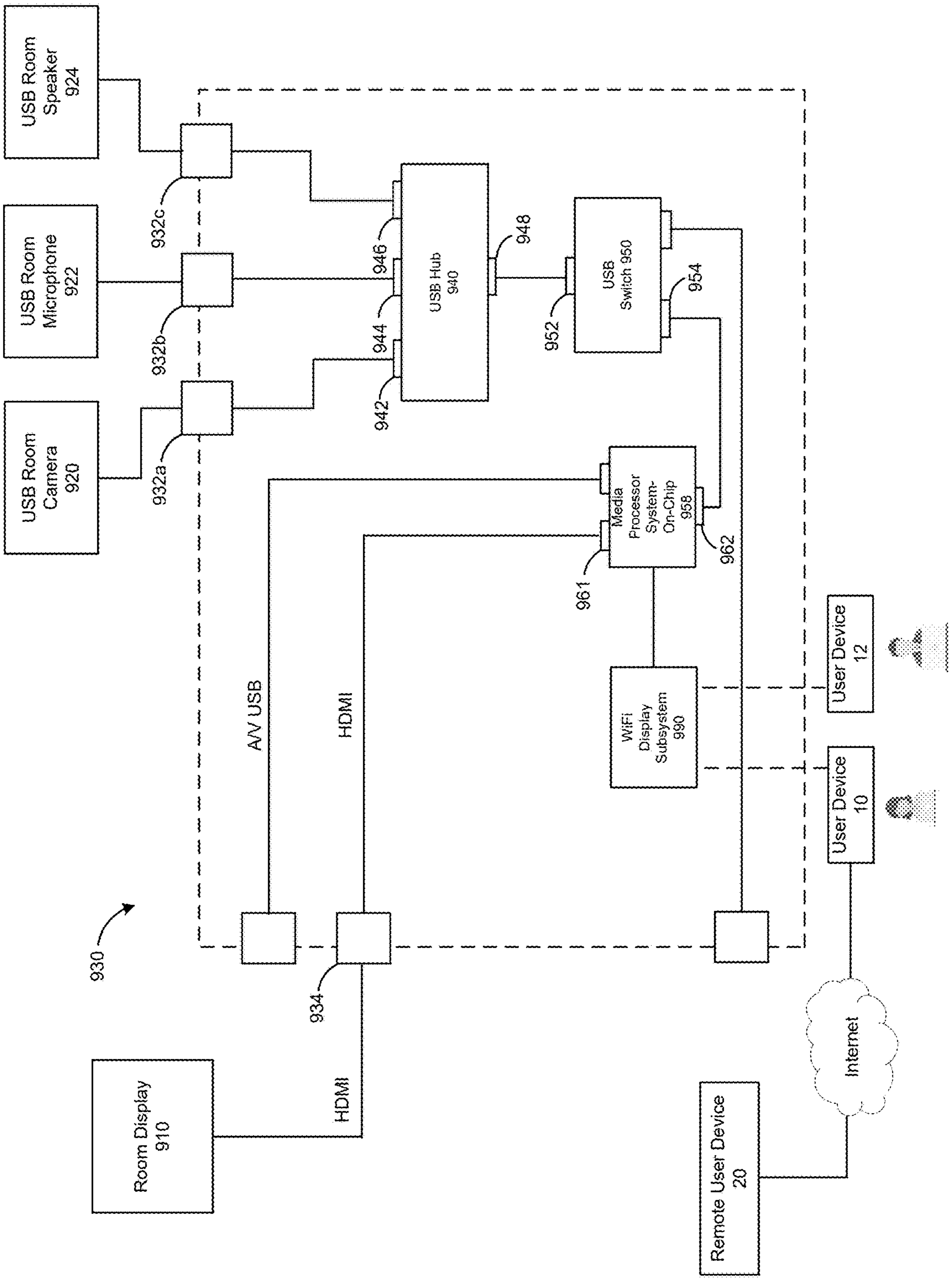
FIG. 9 is a schematic of sample internal components of a wireless display receiver configured for standalone conferencing in accordance with the principles of the present disclosure.

Referring now to FIG. 9, a wireless display receiver with integrated USB switch & audio video capture to USB port, e.g., All-in-One (AIO) receiver 930, configured for standalone conferencing is provided. FIG. 9 illustrates the internal components of AIO receiver 930, which may be configured similar to AIO receivers 730, 830. AIO receiver 930 may be operatively coupled to one or more user devices, e.g., user device 10 and/or user device 12, operated by one or more users for transmitting data between the user device, room display 910, remote user device 20, and one or more room peripheral devices, e.g., USB room camera 920, USB room microphone 922, and USB room speaker 924. The conference host user device, e.g., user device 12 installed the same conferencing application as the remote user device must run a dedicated conferencing software application to facilitate communication between the respective user device and AIO receiver 930. AIO receiver 930 may be operatively coupled to room display 910 via HDMI output port 934 of AIO receiver 930, such that video data, e.g., image and audio data, may be transmitted from AIO receiver 930 to room display 910 via an HDMI connection, e.g., an HDMI cable. AIO receiver 930 may be operatively coupled to the one or more room peripheral devices, e.g., USB room camera 920, USB room microphone 922, and USB room speaker 924, via one or more device ports, e.g., device ports 932*a*, 932*b*, 932*c*, respectively, such that data may be transmitted between the one or more room peripheral devices and AIO receiver 930 via one or more USB connections, e.g., USB cables.

Data flow between the user device, e.g., user device 12, AIO receiver 930, room display 910, and the one or more room peripheral device may be similar to the BYOM conference data flow between user device 12, AIO receiver 730, room display 710, and the one or more room peripheral device of system 700 shown in FIG. 7B. For example, during standalone conferencing by user device 10, data may be directed between user device 12 and the one or more room peripheral devices, e.g., USB room camera 920, USB room microphone 922, and USB room speaker 924, via one or more device ports, e.g., device ports 932*a*, 932*b*, 932*c* of AIO receiver 930, respectively, ports 942, 944, 946 of USB hub 940, respectively, port 948 of USB hub 940, hub port 952 of USB switch 950, host port 954 of USB switch 950, USB input port 962 of media processor system-on-chip 958, and a wireless connection between user device 12 and WiFi display subsystem 990. Moreover, video data may be directed from user device 12 to room display 910 via a wireless connection between user device 12 and WiFi display subsystem 990, HDMI output port 961 of media processor system-on-chip 958, HDMI output port 934 of AIO receiver 930, and an HDMI input port of room display 910. Data, including video data, may be transmitted between remote user device 20 and user device 12 via an internet connection.

In accordance with another aspect of the present disclosure, the systems described herein may conduct both a UC&C conference and a BYOM conference simultaneously. For example, a UC&C platform room device such as a generic PC may connect wirelessly to the wireless display receiver/AIO receiver, such that the media processor system-on-chip of the wireless display receiver/AIO receiver facilitated with special video control software may process and bridge the UC&C conference and the BYOM conference to achieve a 3-way conference with different conferencing applications.

While various illustrative embodiments of the invention are described above, it will be apparent to one skilled in the art that various changes and modifications may be made therein without departing from the invention. Moreover, while a wireless display receiver is described herein, as will be understood by a person having ordinary skill in the art, the display receiver may be a non-wireless display receiver. The remote user device could be one or more remote user devices. The appended claims are intended to cover all such changes and modifications that fall within the true scope of the invention.

What is claimed:

1. A system for sharing control of one or more room peripheral devices between a Unified Communication & Collaboration (UC&C) platform room device operatively coupled to a room display and a Bring Your Own Meeting (BYOM) host user device for hosting a BYOM video conference, the BYOM host user device operatively coupled to a remote user device, the system comprising:

a collaboration device comprising a USB host port and configured to be operatively coupled to a plurality of user devices and to the UC&C platform room device, the collaboration device configured to selectively transmit video data from the plurality of user devices and the remote user device to the UC&C platform room device, and to switch from an idle state to an active state upon initiation of the BYOM video conference by the BYOM host user device, the video data comprising peripheral data generated by the one or more room peripheral devices while the collaboration device is in the active state; and a USB peripheral switching device configured to be operatively coupled to the collaboration device, the one or more room peripheral devices, and to the UC&C platform room device, the USB peripheral switching device configured to switch control of the one or more room peripheral devices between the UC&C platform room device when the collaboration device is in the idle state and the collaboration device when the collaboration device is in the active state, wherein the USB peripheral switching device is operatively coupled to the collaboration device via an in-band USB switch control in electrical communication with the USB host port, and wherein the USB peripheral switching device is configured to switch control of the one or more room peripheral devices to the collaboration device based on a sensed set voltage of the USB host port.

2. The system of claim 1, wherein, when the collaboration device is in the idle state, video data is transmissible from a UC&C host user device to a remote user device operatively coupled to the UC&C platform room device and to the room display via the UC&C platform room device, from at least one of the one or more room peripheral devices to the remote user device operatively coupled to the UC&C platform room device and to the room display via the UC&C platform room device, and between the UC&C platform room device and the remote user device operatively coupled to the UC&C platform room device, and video data is selectively transmissible from the plurality of user devices and the remote user device operatively coupled to the UC&C platform room device to the room display via the UC&C platform room device, and from the plurality of user devices to the remote user device operatively coupled to the UC&C platform room device via the UC&C platform room device, responsive to user input received by the UC&C host user device.

3. The system of claim 1, wherein, when the collaboration device is in the active state, video data is transmissible from the BYOM host user device to the room display via the UC&C platform room device, from at least one of the one or more room peripheral devices to the remote user device via the BYOM host user device and to the room display via the UC&C platform room device, and between the BYOM host user device and the remote user device operatively coupled to the BYOM host user device, and video data is selectively transmissible from the plurality of user devices and the remote user device to the room display via the UC&C platform room device, and from the plurality of user devices to the remote user device via the BYOM host user device, responsive to user input received by the BYOM host user device.

4. The system of claim 1, wherein the collaboration device comprises a wireless display receiver.

5. The system of claim 1, wherein the one or more room peripheral devices comprise at least one of a USB camera, USB microphone, or USB speaker.

6. The system of claim 1, wherein the USB peripheral switching device comprises:

a first host port configured to be operatively coupled to the UC&C platform room device via a first USB connection;

a second host port configured to be operatively coupled to the collaboration device via a second USB connection; and one or more device ports configured to be operatively coupled to the one or more room peripheral devices via one or more USB connections.

7. The system of claim 6, wherein the USB peripheral switching device is configured to direct data between the one or more device ports and the first host port when the collaboration device is in the idle state, and between the one or more device ports and the second host port when the collaboration device is in the active state.

8. The system of claim 6, wherein, when the collaboration device is in the active state, a USB switch control module of the collaboration device causes a power of the second USB connection to reach a threshold power level, such that the second host port of the USB peripheral switching device transitions to an activated state when the power of the second USB connection is at the threshold power level, the USB peripheral switching device configured to direct data between the one or more device ports and the second host port when the second host port transitions to the activated state, and wherein, when the collaboration device is in the idle state, the USB switch control module causes the power of the second USB connection to be zero volts, such that the second host port transitions to an inactivated state when the power of the second USB connection is zero volts.

9. The system of claim 8, wherein the threshold power level is 5 volts.

10. The system of claim 1, wherein the USB peripheral switching device and the collaboration device are integrated within a single All-in-One (AIO) receiver device, the AIO receiver device comprising:

a USB peripheral port configured to be operatively coupled to the UC&C platform room device via a first USB connection; and one or more device ports configured to be operatively coupled to the one or more room peripheral devices via one or more USB connections.

11. The system of claim 10, wherein the AIO receiver device further comprises an HDMI output port configured to be operatively coupled to an HDMI input port of the UC&C platform room device via a first HDMI connection, and wherein the UC&C platform room device is operatively coupled to the room display via a second HDMI connection.

12. The system of claim 10, wherein the AIO receiver device further comprises a USB audio and video output port configured to be operatively coupled to a USB port of the UC&C platform room device via a second USB connection, and wherein the UC&C platform room device is operatively coupled to the room display via an HDMI connection.

13. A method for sharing control of one or more room peripheral devices between a Unified Communication & Collaboration (UC&C) platform room device operatively coupled to a room display and a Bring Your Own Meeting (BYOM) host user device for hosting a BYOM video conference, the BYOM host user device operatively coupled to a remote user device, the method comprising:

operatively coupling a collaboration device to a plurality of user devices and the UC&C platform room device, the collaboration device comprising a USB host port;

operatively coupling a USB peripheral switching device to the collaboration device via an in-band USB switch control in electrical communication with the USB host port, one or more room peripheral devices, and the UC&C platform room device;

automatically switching, upon initiation of the BYOM video conference by the BYOM host user device, the collaboration device from an idle state where the USB peripheral switching device automatically switches control of the one or more room peripheral devices to the UC&C platform room device to an active state where the USB peripheral switching device automatically switches control of the one or more room peripheral devices to the collaboration device;

conducting the BYOM video conference when the collaboration device is in the active state; and selectively transmitting, via the collaboration device, video data from the plurality of user devices and the remote user device to the UC&C platform room device, the video data comprising peripheral data generated by the one or more room peripheral devices while the collaboration device is in the active state;

wherein the USB peripheral switching device automatically switches control of the one or more room peripheral devices based on a sensed set voltage of the USB host port.

14. The method of claim 13, wherein conducting the BYOM video conference when the collaboration device is in the active state comprises:

transmitting video data from the BYOM host user device to the room display via the UC&C platform room device, from at least one of the one or more room peripheral devices to the remote user device via the BYOM host user device and to the room display via the UC&C platform room device, and between the BYOM host user device and the remote user device operatively coupled to the BYOM host user device; and selectively transmitting video data from the plurality of user devices and the remote user device to the room display via the UC&C platform room device, and from the plurality of user devices to the remote user device via the BYOM host user device, responsive to user input received by the BYOM host user device.

15. The method of claim 13, wherein, when the collaboration device is in the active state, a USB switch control module of the collaboration device sets a power level of the USB host port of the collaboration device to a threshold power level, which causes the USB peripheral switching device to sense, via the in-band USB switch control, voltage associated with the USB host port of the collaboration device, such that the USB peripheral switching device automatically switches control of the one or more room peripheral devices to the collaboration device based on the sensed voltage.

16. The method of claim 15, wherein the threshold power level is 5 volts.

17. The method of claim 15, wherein, when the collaboration device is in the active state, the USB switch control module of the collaboration device sets the power level of the USB host port of the collaboration device to zero volts, which causes the USB peripheral switching device to automatically switch control of the one or more room peripheral devices to the UC&C platform room device.

18. The method of claim 13, wherein the USB peripheral switching device and the collaboration device are integrated within a single All-in-One (AIO) receiver device, and wherein conducting the BYOM video conference when the collaboration device is in the active state comprises transmitting video data between an HDMI output port of the AIO receiver device and an HDMI input port of the UC&C platform room device via a first HDMI connection, and between the UC&C platform room device and the room display via a second HDMI connection.

19. The method of claim 13, wherein the USB peripheral switching device and the collaboration device are integrated within a single All-in-One (AIO) receiver device, and wherein conducting the BYOM video conference when the collaboration device is in the active state comprises transmitting video data between a USB audio and video output port of the AIO receiver device and a USB port of the UC&C platform room device via a USB connection, and between the UC&C platform room device and the room display via an HDMI connection.

20. The method of claim 13, further comprising automatically switching the collaboration device to the idle state when the BYOM host user device stops the BYOM video conference.

* * * * *